US011423082B2

(12) United States Patent
Vikhe et al.

(10) Patent No.: US 11,423,082 B2
(45) Date of Patent: Aug. 23, 2022

(54) METHODS AND APPARATUS FOR SUBGRAPH MATCHING IN BIG DATA ANALYSIS

(71) Applicant: Intel Corporation, Santa Clara, CA (US)

(72) Inventors: Nikita M. Vikhe, Lubbock, TX (US); Sanjay V. Addicam, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 1078 days.

(21) Appl. No.: 15/196,916

(22) Filed: Jun. 29, 2016

(65) Prior Publication Data

US 2018/0004751 A1 Jan. 4, 2018

(51) Int. Cl.
*G06F 16/90* (2019.01)
*G06F 16/901* (2019.01)
(Continued)

(52) U.S. Cl.
CPC ........ *G06F 16/9024* (2019.01); *G06F 16/248* (2019.01); *G06F 16/24578* (2019.01)

(58) Field of Classification Search
CPC ........... G06F 16/9024; G06F 16/24522; G06F 21/552; G06F 16/2246; G06F 16/245;
(Continued)

(56) References Cited

U.S. PATENT DOCUMENTS 8,787,700 B1 * 7/2014 Aly ......................... G06V 20/10
382/294
9,439,053 B2 * 9/2016 Abraham ................ H04W 4/21
(Continued)

FOREIGN PATENT DOCUMENTS

WO 2014092536 6/2014

OTHER PUBLICATIONS

International Searching Authority, "International Search Report and Written Opinion", issued in connection with PCT patent application No. PCT/US2017/031547, dated Aug. 17, 2017, 10 pages.
(Continued)

*Primary Examiner* — Alford W Kindred
*Assistant Examiner* — Cecile H Vo
(74) *Attorney, Agent, or Firm* — Hanley, Flight & Zimmerman, LLC

(57) ABSTRACT

Methods, apparatus, systems and articles of manufacture are disclosed to analyze graph information. An example apparatus includes a graph computational processor. The example graph computational processor is configured to analyze a first graph with respect to a second graph to identify a third graph within the first graph by: matching a first triplet from the first graph to a second triplet from the second graph by comparing each node and connecting edge included in each triplet; and generating the third graph by adding, when the first triplet matches the second triplet, the first triplet to a subgraph output set forming the third graph. The example graph computational processor of is configured to identify an additional node in the first graph based on the third graph and generate an output based on the additional node.

19 Claims, 14 Drawing Sheets

(51) Int. Cl.
    *G06F 16/2457* (2019.01)
    *G06F 16/248* (2019.01)
    *G06F 16/245* (2019.01)
(58) Field of Classification Search
    CPC ............. G06F 16/3328; G06F 16/7335; G06F 16/24578; G06F 16/248
    See application file for complete search history.

(56) References Cited

U.S. PATENT DOCUMENTS

| | | | |
|---|---|---|---|
| 9,535,963 B1* | 1/2017 | Shankar ................ | G06F 16/248 |
| 2007/0209074 A1* | 9/2007 | Coffman ................ | G06F 21/552 |
| | | | 709/224 |
| 2010/0228742 A1* | 9/2010 | Vandelle ................ | G06Q 30/02 |
| | | | 707/750 |
| 2013/0335422 A1* | 12/2013 | Saund ................... | G06T 11/206 |
| | | | 345/440 |
| 2014/0006338 A1 | 1/2014 | Watson et al. | |
| 2014/0267343 A1* | 9/2014 | Arcas ................... | G06T 19/003 |
| | | | 345/582 |
| 2015/0095303 A1 | 4/2015 | Sonmez et al. | |
| 2015/0261881 A1* | 9/2015 | Wensel ................. | G06F 9/4494 |
| | | | 707/798 |
| 2016/0004978 A1 | 1/2016 | Goldschmidt et al. | |

OTHER PUBLICATIONS

International Bureau, "International Preliminary Report on Patentability," issued in connection with PCT patent application No. PCT/US2017/031547, dated Jan. 10, 2019, 7 pages.

* cited by examiner

METHODS AND APPARATUS FOR SUBGRAPH MATCHING IN BIG DATA ANALYSIS

FIELD OF THE DISCLOSURE

This disclosure relates generally to graph analytics, and, more particularly, to methods and apparatus for subgraph matching in big data analysis.

BACKGROUND

In recent years, a number of electronic devices able to generate data has rapidly increased. Data generated by electronic devices can be gathered, organized, and stored on a server and/or other cloud-based storage device. Graphs are example data structures that can be used to store relationships between data points for later search and retrieval.

DETAILED DESCRIPTION

Figure 1:
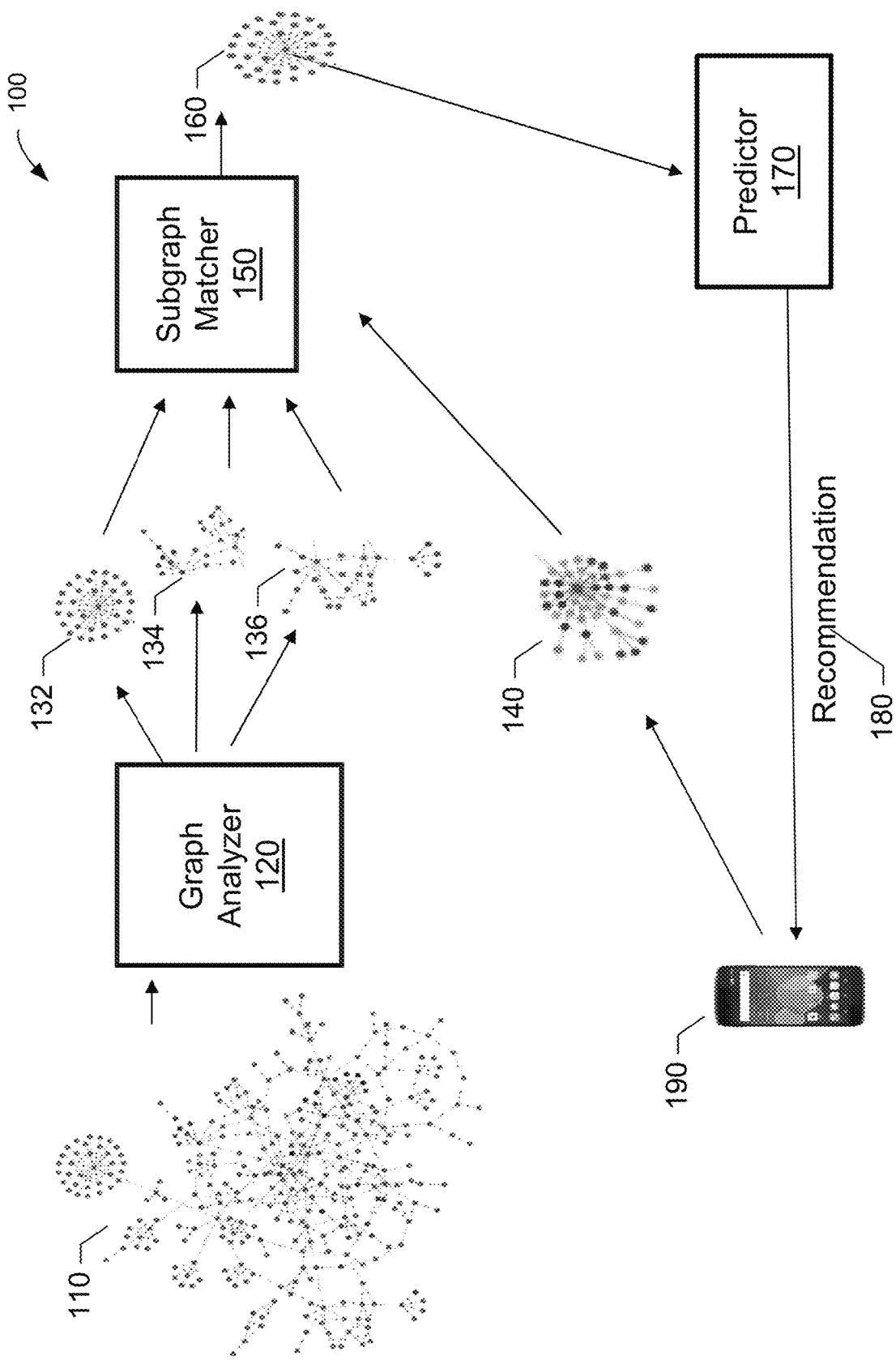
FIG. 1 illustrates an example graph analysis architecture.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Graphs are example data structures that can be used to store relationships between data points. In certain examples, a global graph (also referred to herein as a "global Big Data graph", a "large data graph", or a "global data graph") stores multiple user interactions. Graph analytics is the study and analysis of data that can be represented as nodes and edges in a graph. However, given an exponential growth of data, implementing a scalable graph analytics solution is a challenge. Certain examples extract and analyze data, such as data from a mobile device, to generate relationship-based analytics, such as recommendations to a user, via a graph.

In certain examples, each user can be associated with a subgraph (also referred to as a user graph). Each user's subgraph can be used to relate the user's activities with a subgraph from mapped data points in the global graph. As described further below, one or more subgraph matching algorithms can be used to match a user subgraph with a portion of the global graph. For example, given a data graph G and a query graph Q, a subgraph of G which is best matching to Q can be retrieved.

An ability to handle large scale graph data is important to an increasing number of applications. Much work has been dedicated to supporting basic graph operations such as subgraph matching, reachability, regular expression matching, etc. In many cases, graph indices are employed to speed up query processing. Typically, most indices require either super-linear indexing time or super-linear indexing space. Unfortunately, for very large graphs, super-linear approaches are almost always infeasible.

Certain examples provide systems and methods to enable efficient subgraph matching for graphs deployed on a distributed memory store. Certain examples identify an exact match and/or one or more inexact matches. That is, partial matching of graph attributes can be achieved using inexact subgraph matching while allowing few intermediate nodes in the graph analysis. As described further below, certain examples also provide improved matching of nodes in a subgraph regardless of the form and/or structure of the global data graph. Thus, certain examples provide efficient and less restrictive methods for subgraph matching in big data analysis.

In some examples, subgraph search algorithms are linear and based on finding an exact match to a provided query graph. Such linear, exact matching, however, may not meet efficiency and accuracy requirements when applied to a large-scale, global, Big Data graph structure. In some examples, the large size can be accommodated by parallel processing of search and by searching a partial match subgraph that includes nodes of the query graph.

For example, a global graph (e.g., millions of nodes, thousands of nodes, etc.) is created from various types of nodes via a server in a cloud-based organization structure. The nodes of the global graph represent various types of activities such as user movement (e.g., walking), communication (e.g., telephone calls), web browsing, application usage (AU), keywords, products, etc. Each activity is represented by a node in the global graph. An edge between two nodes represents a relationship between the activities corresponding to the two nodes.

Nodes can be formed in the global graph by analyzing web browser history, mobile device (e.g., cellular phone, tablet, etc.) usage, etc., to collect and classify/categorize user activity. For example, for each browser history node, one or more keywords are collected for viewed web page(s) using a web scraping module. The collected keyword(s) form nodes in the graph. Collected keyword(s) can then be connected to one or more products viewed and/or purchased, which are also represented by nodes in the global graph. For a given user, a user graph can be created based on activities done by that user over a time period (e.g., a prior 24 hours, 48 hours, a week, a month, etc.). Then, a portion of the graph (e.g., approximately 100,000 nodes, 5000 nodes, 3000 nodes, 2000 nodes, etc.) can be extracted or "cut" to represent a most likely user behavior. The cut portion of the user graph is sent to a device associated with the user (e.g., a phone, tablet, and/or other mobile device). The graph portion is then used to provide a recommendation and/or otherwise predict what the user might do next.

Finding a matching subgraph is an important problem in many applications that use data modeled as one or more graphs. In some examples, the global graph is processed using a software-based algorithm such as a graph cut, approximate subgraph matching (ASM), graph merge, and/or other graph algorithm implemented using Java, Java Universal Network/Graph Framework (JUNG) application programming interface (API), C Sharp (C#), structured query language (SQL), PHP, etc. Example algorithms proposed to solve a subgraph matching problem include GraphGrep, gIndex, FGIndex, Tree+Δ, gCode, SwiftIndex, CTree, Ullmann, VF2 and QuickSI, GraphQL. These algorithms use different graph indexing methods and were originally designed for handling small graphs. Typically, however, most indices involve either superlinear indexing time or superlinear indexing space.

A minimum spanning tree can be determined by removing superfluous edges in the global data graph to retain only the most important edges. Nodes in the minimum spanning tree having the most connections are identified and used as a pivot to cut the graph into smaller subgraphs. An approximate subgraph matching algorithm is used with exact and inexact matches to find a most suitable subgraph to send to a user. A prediction can be made using the subgraph sent to the mobile phone and/or other user device.

Unfortunately, for very large graphs (e.g., "big data" graphs), linear approaches are not always feasible due to high processing power and time complexity issues involved. Such subgraph cutting is also rigid and is done without considering a user subgraph. Important information (e.g., edges and vertices) may also be sacrificed in order to handle complexity. Rigid subgraph cutting is also difficult to scale or divide among distributed computing resources via a backend server. In contrast, certain examples enable efficient subgraph matching for graphs by deploying a global big data graph on distributed processing system clusters and applying massively parallel processing (MPP) techniques for subgraph analysis based on a user graph.

Certain examples build a foundation of distributed computing technology based on scalable graph and graph-parallel computation algorithms (e.g., Apache Spark GraphX, etc.). The graph and graph-parallel computation technologies extend a resilient distributed dataset (RDD) of collected elements (e.g., monitored user activities, etc.) using a graph abstraction.

An RDD is a distributed memory abstraction that allows in-memory computations to be performed on large clusters of data in a fault-tolerant manner. RDDs are motivated by iterative algorithms and interactive data mining tools and provide parallel data structures (e.g., a parallel, partitioned collection of data records) that allow users to explicitly persist intermediate results in memory, control partitioning to optimize or improve data placement, and manipulate the data using a rich set of operators, for example. RDDs provide an interface based on coarse-grained transformations (e.g., map, filter, join, etc.) that apply the same operation to many data items.

Each RDD is characterized by five main properties: 1) a list of partitions, 2) a function for computing each split, 3) a list of dependencies on other RDD(s), 4) (optionally) a partitioner for key-value RDDs (e.g., to indicate the RDD is hash-partitioned), and 5) (optionally) a list of preferred locations to compute each split (e.g., block locations for a Hadoop Distributed File System (HDFS) file, etc.). Certain examples extend an RDD through a graph abstraction: a directed multigraph with properties attached to each vertex (node) and edge of the graph. To support graph computation, certain examples provide a set of fundamental operators (e.g., subgraph, joinVertices, aggregateMessages, mapReduceTriplets, etc.) for graph analytics. By focusing on techniques to partition and distribute graphs and restricting other computations, a graph-parallel system can execute graph algorithms with respect to the RDDs orders of magnitude faster than more general data-parallel systems. Data can be viewed in graph form and/or as a collection of data (e.g., RDDs) without data movement or duplication.

Thus, RDDs form nodes or vertices joined by edges in a directed multigraph. Each vertex and edge in the graph is associated with an object (e.g., a property) such that each vertex has an identifier (ID) and a property, and each edge that connects vertices in the graph has a source ID, a destination ID, and an associated property, for example. A triplet can be formed from an edge and its two connected vertices (e.g., a source node and a destination node) and includes a logical joining of the properties of the vertices and their common edge.

A large "big data" graph at the backend can be distributed over multiple cluster nodes in a distributed computing system (e.g., a "cloud"-based system, etc.). Rather than cutting the main big data graph into subgraphs based on an identification of most connected nodes from a minimal spanning tree analysis and then trying to match subgraphs with an input user graph, certain examples query the large main graph using the user graph for comparison to extract only those subgraph(s) that are relevant to the particular user (as evidenced by the user graph). Such a query is referred to as a subgraph isomorphism.

Querying a large graph of millions of nodes, however, requires optimizations in order to exhibit an acceptable response time. For at least this reason, both vertex and edge indexes are implemented using the RDDs (e.g., SPARK RDD's, etc.) as described above. An outcome of the subgraph isomorphism analysis is a subgraph extracted from the large backend graph that best matches the input user mobile graph. The input mobile graph represents user's most recent actions via a mobile device (e.g., cellular phone, tablet, etc.). In certain examples, graph nodes representing activities can be given varying weights in order to assign more or less importance to certain activities (e.g., product purchases, event attendance, etc.) and/or aspects of activities (e.g., duration spent viewing an item, event duration, event frequency, etc.). The flexible user input graph helps to facilitate customized graph cutting and scalability, for example.

Some algorithms such as a Tool for Approximate Subgraph Matching of Large Queries Efficiently (TALE) algorithm, Set-cover-based Inexact Graph Matching Algorithm (SIGMA) algorithm, and Neighborhood Based Similarity Search (NESS) algorithm, have been developed for approximate subgraph matching. These algorithms, however, use pruning techniques to determine an approximate incomplete subgraph match, resulting in few relevant matching nodes with the query graph. In contrast, certain examples identify exact as well as inexact matches including some intermediate nodes to identify many possible matching nodes.

Certain examples provide systems and methods to support efficient subgraph matching for graphs deployed on a distributed memory store. Certain examples identify an exact as well as an exact subgraph matches to facilitate partial matching of attributes with few intermediate nodes. Certain examples prioritize matching nodes in a query graph rather than a particular graph form or structure.

Conventional subgraph search algorithms are linear and based on a principle of finding an exact match to a provided query graph. This approach does not meet efficiency and accuracy considerations when applied to a large global graph structure. Certain examples overcome the and efficiency and inaccuracy of linear subgraph search algorithms by parallel processing of search and searching partial subgraph matches to include nodes of the subgraph. Thus, certain examples proactively build a foundation of technologies in a distributed computing environment. A large data graph stored in the backend is distributed across multiple foster nodes. Rather than cutting the large data graph into subgraphs based on most connected notes, the large data graph is queried using a user query graph to extract only those subgraph(s) that include matching nodes with the query graph.

If there are no exact matches available, a partial match is evaluated, and nodes are selected that are the best match for the query graph nodes. If some of the matching nodes are not connected in the subgraph, the closest matching node is identified, and intermediate nodes along a shortest path to the closest matching node are added to form a matching subgraph. This partial matching makes querying less restrictive and provides quick results.

FIG. 1 illustrates an example graph analysis architecture 100. The example graph analysis architecture 100 includes a big data graph 110 analyzed by a graph analyzer 120 to identify one or more subgraphs 132, 134, 136, and a query graph 140 used by a subgraph matcher 150 to determine a best match subgraph 160 from the big data graph 110. Additionally, the example architecture 100 includes a predictor 170 to generate a recommendation 180 based on the best match subgraph 160. The recommendation 180 can be provided to a user via his/her mobile device 190, for example. For example, the query graph 140 can include information regarding user, keyword, product, history, etc., and the recommend 180 provided to the mobile device 190 can include an additional item(s) (e.g., keyword, product, location, etc.) extrapolated based on the best match subgraph 160. In certain examples, the graph analyzer 120 includes a graph cut algorithm dividing the big data graph 110 into subgraphs 132, 134, 136 based on, for example, a least edges disrupted analysis.

Figure 2:
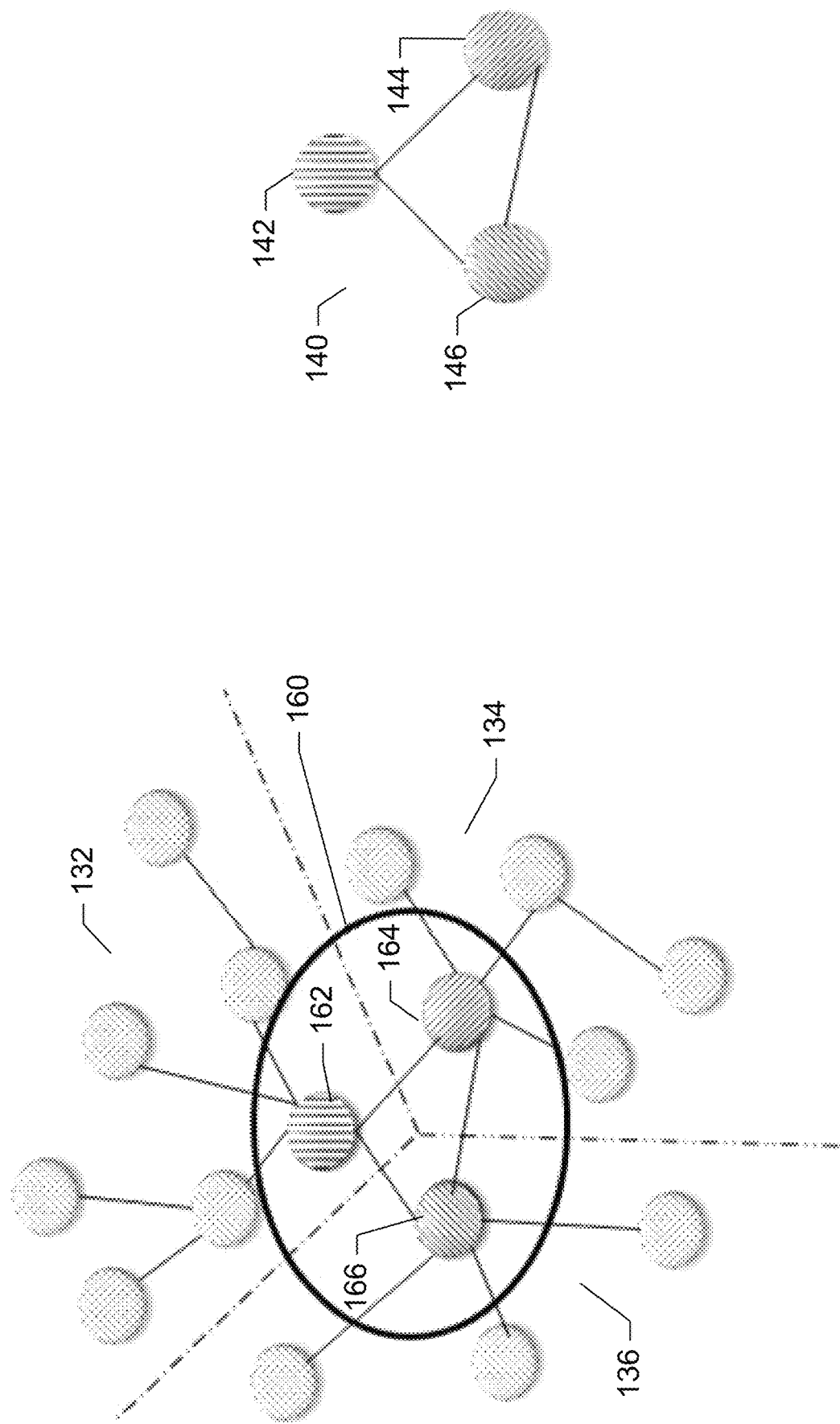
FIG. 2 shows an example big data graph divided into three subgraphs using static subgraph cutting.

As shown in FIG. 2, the big data graph 110 can be divided into three subgraphs 132, 134, 136 using static subgraph cutting. However, the query graph 140 (e.g., a user actions graph, etc.) including nodes 142, 144, 146 may not match any of the identified subgraphs 132, 134, 136 in the big data graph 110. Instead, as illustrated in the example of FIG. 2, a subgraph 160 including nodes 162, 164, 166 corresponding to the query graph 140 of interest may be found to cut across all three subgraphs 132, 134, 136 in the big data graph 110. As will be described further below, and analysis of several graph nodes or elements 162, 164, 166 can instead be used to identify the matching subgraph 160 of interest.

Figure 3:
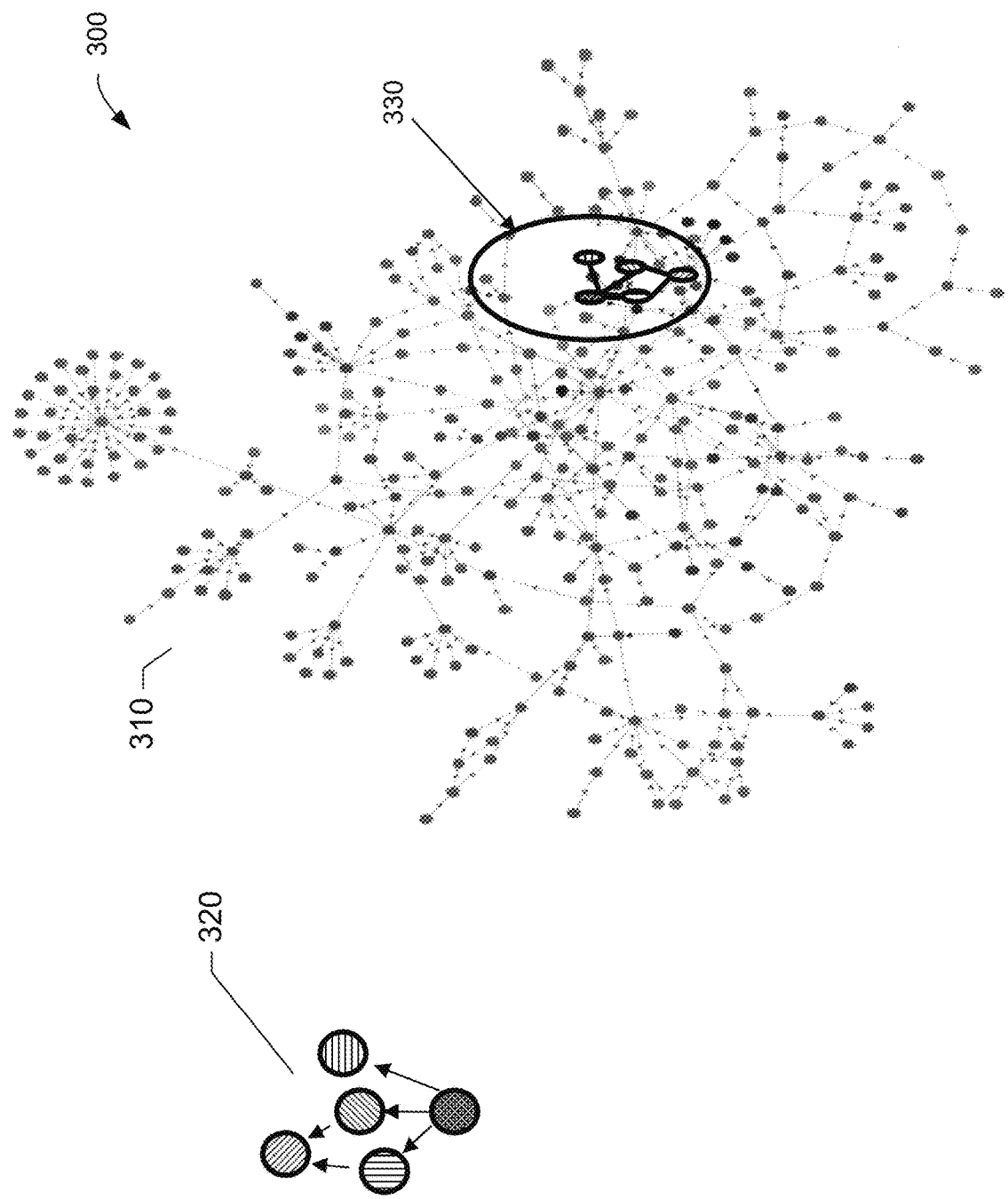
FIG. 3 illustrates example graph analytics used to analyze individual nodes and groups of nodes in a graph to identify a subgraph of interest.

FIG. 3 illustrates example graph analytics 300 used, in contrast to graph cutting, to analyze individual nodes and groups of nodes in a graph to identify a subgraph of interest. The example of FIG. 3 includes a big data graph 310 including a large plurality of nodes. The example of FIG. 3 also includes a query graph 320. The query graph 320 is used to retrieve a subgraph 330 included in the data graph 310 which matches the query graph 320. Thus, using the query graph 320, the big data graph 310 can be analyzed to retrieve a subgraph 330 which best matches the query graph 320.

Figure 4:
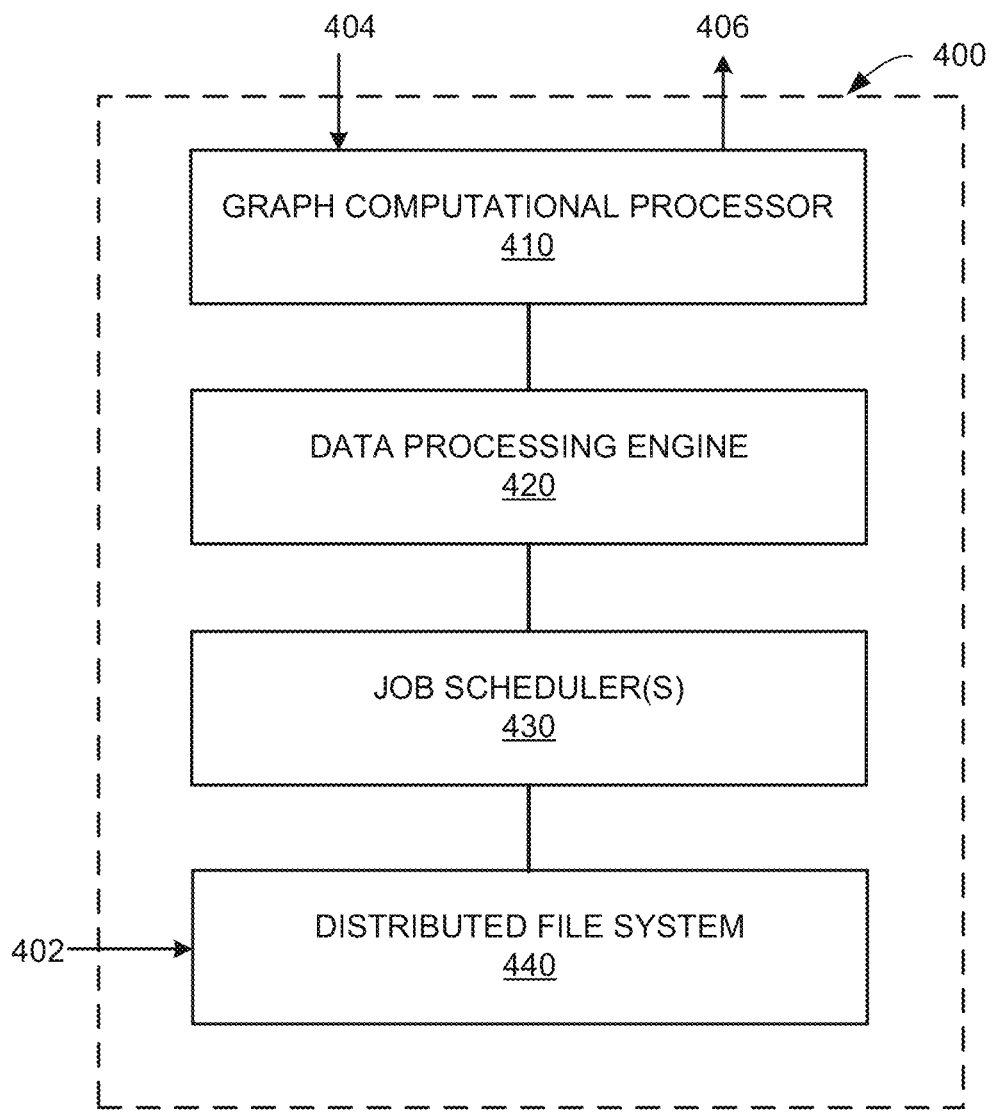
FIG. 4 illustrates an example graph processing architecture to process graph data and graph-parallel computation to retrieve a subgraph from a main graph that best matches a query graph.

FIG. 4 illustrates an example graph processing architecture 400 to process graph data and graph-parallel computation to retrieve a subgraph 330 from a main graph 310 that best matches a query graph 320. The example graph processing architecture 400 operates on a first input 402 including the main graph 310 and a second input 404 including the query graph 320 to generate an output 406 (e.g., based on the identified subgraph 330). The example graph processing architecture 400 includes a graph computational processor 410, a data processing engine 420, one or more job schedulers 430, and a distributed file system 440.

The example graph computational processor 410 is configured to process graphs and graph-parallel computation (e.g., an Apache Spark GraphX processor API, etc.), for example. The example data processing engine 420 (e.g., Apache Spark™, etc.) provides large scale data processing to support the graph and graph-parallel computation of the big data graph 310 based on the query graph 320. The example job scheduler(s) 430 include one or more job schedulers (e.g., Local Scheduler, Standalone Scheduler, Apache Hadoop YARN (schedule based on task-dependency and resource-demand), Apache Mesos (distributed, fault-tolerant scheduler), etc.) to control background program execution of jobs with respect to the data processing engine 420. The example distributed file system 440 (e.g., Apache Hadoop HDFS distributed file system, etc.) provides high-performance access to data across distributed file system clusters.

Using the example graph processing architecture 400, a query graph Q can be processed to retrieve a subgraph S of a big data graph G that is best matching to the query graph Q. A "best match" is determined by matching a greatest number of possible relevant nodes from the query graph Q in the big data graph G to identify the returned subgraph S. The graph computational processor 410, in conjunction with the data processing engine 420, can evaluate edge triplets (e.g., edge, source vertex, and destination vertex) from the input query graph Q 320 one by one to look for a match in big data Graph G 310, select the best match, and store the best match in an S-set (e.g., an output subgraph, etc.) used to form the subgraph 330. The Big Data graph G 310 in the input 402 can be stored on distributed memory 440 so operations can be executed in parallel mode via a plurality of job schedulers 430 executing resources of the data processing engine 420, for example.

While searching for the best match for a triplet, a source node, destination node, and edge forming the triplet are scored by the graph computational processor 410 based on one or more pre-defined criterion (e.g., user, keyword, product, duration, history, etc.) for a match. In certain examples, a triplet is represented by identifying its source and destination nodes, and the edge connecting those nodes can be inferred from the source, destination notation (e.g., Triplet_1(src_id, dest_id) such as Triplet_1(Facebook_15, Gmail_10), etc.). The output subgraph is a connected subgraph so, while selecting a matching triplet to Q from big data graph G, preference can be given to the triplet(s) which are connected to the output subgraph S.

If matching triplets identified by the graph computational processor 410 do not have any direct connection with the output subgraph, a distance (e.g., a number of nodes and connecting edges, etc.) from the output subgraph to each triplet is checked, and a matching triplet that is closest to the output subgraph is selected. A path to the selected matching triplet from the main graph G is also added to provide a connected output subgraph S.

For example, the graph computational processor 410 utilizes the data processing resources of the data processing engine 420 to execute the following new subgraph isomorphism algorithm to identify a subgraph S from a big data graph G using a query graph Q. To solve for the subgraph, S, the graph computational processor 410 processes triplets identified in the query graph Q as follows (Algorithm 1):

```
S = φ
While Q Query graph has no more edge triplets do (x, y)
    If S = φ then,
        Pick an edge triplet from subgraph output (x, y) such
        that w(x)+w(y)+w(x,y) is largest
        S <-(x, y)
    Else
        Pick an edge triplet from subgraph output (x, y) such
        that
        For edge triplets (u, v) from subgraph output where x or
        y ∈ S
            If number of edge triplets returned > 0
                Pick one with w(x)+w(y)+w (x, y) is largest
                S <-(x, y)
            Else
                Pick one with largest (w(x)+w(y)+w(x,y) -
                distance from S) and distance < threshold
                S <-(x, y) and also the edges in between
End of while.
```

In the above algorithm, w(x) and w(y) are weights associated with nodes x and y, respectively, and w(x,y) is a weight associated with the edge connecting nodes x and y in the graph. Thus, the processing starts with an initial edge triplet selected from a set of available edge triplets from the query graph Q 320 and progresses through triplets with the largest weight or score based on matching user, keyword, product, browser history, number of matching tokens, duration, etc. Triplets from the main graph G 310 that closely match the user graph Q 320 (e.g., have the largest weight or score, etc.) are added to the set of the subgraph S 330 until some or all connected triplets have been analyzed. Preference is given to a matching triplet from G 310 that is connected to the output subgraph S 330 (e.g., x or y∈S). However, if an identified matching triplet has no direct connection with the output subgraph (else), a distance between the matching triplet(s) and the output subgraph is evaluated, and the matching triplet with the shortest distance is selected and added to the output subgraph S 330 along with edge(s) in between.

Figure 5:
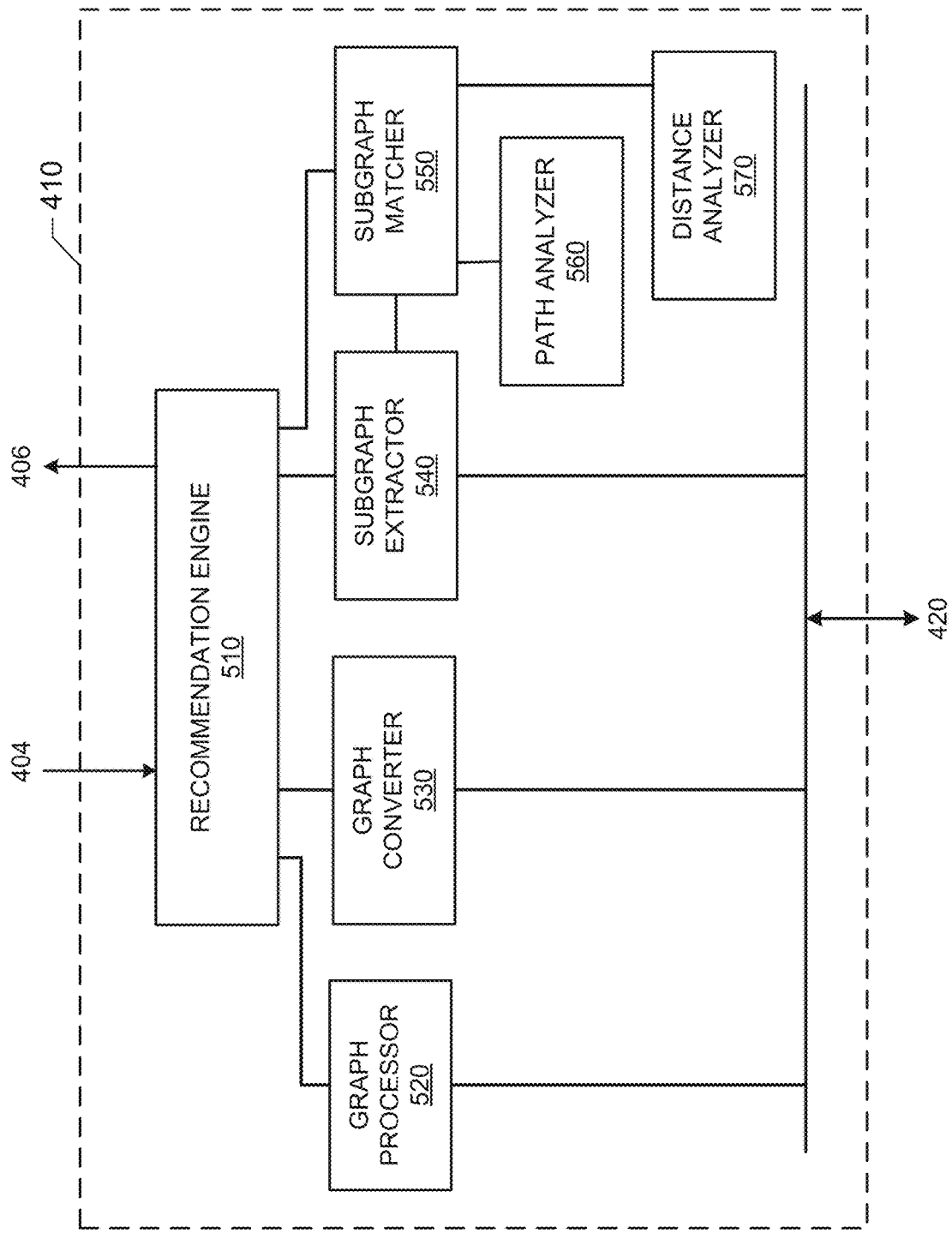
FIG. 5 illustrates an example implementation of the graph computational processor of the example of FIG. 4.

FIG. 5 illustrates an example implementation of the graph computational processor 410 of the example of FIG. 4. As shown in the example of FIG. 5, the example graph computational processor 410 includes a recommendation engine (RE) 510, a graph processor 520, a graph converter 530, a subgraph extractor 540, a subgraph matcher 550, a path analyzer 560, and a distance analyzer 570. The graph computational processor 410 operates on the query graph 320 input 404 to produce the output 406 (e.g., based on an identified subgraph 330 match).

The example graph processor 520 executes graph processing functions to load a graph 310, 320 or portion of a graph and extract graph elements such as node and edge information from the graph data to form triplets. The example graph processor 520 can organize a collection of graph elements as one or more resilient distributed data sets (RDDs). In some examples, an RDD is organized as a fault-tolerant collection of elements that can be operated on in parallel.

The example graph processor 520 can also extract graph information such as browsing history tokens, for example. Browser history tokens, for example, are parsed from the graph information and converted to an array for use in weighting nodes and edges in triplets for subgraph analysis and matching.

The example graph processor 520 can also assign weights to nodes, edges, and/or triplets in the query graph 320. A weight can be assigned based on type of node, edge, and/or triplet such as user, keyword, product, browser history, duration, etc. Weighting can be done for individual nodes and/or combined between source node and destination node for a triplet, for example. In certain examples, triplets are converted into arrays storing an associated weight(s) after weight(s) have been assigned by the graph processor 520.

In certain examples, the example graph converter 530 takes an output of the graph processor 520 (e.g., an array of weighted triplets, etc.) and converts the graph data into an output file for subgraph analysis (e.g., a Graphml file, an extensible markup language (XML) file, etc.). For example, for each row in the weighted graph array generated by the example graph processor 520, the example graph converter 530 creates a graph file element (e.g., an xml element) based on a predefined schema (e.g., Graphml, XML, etc.). A source node, destination node, and edge forming a triplet defined by a row in the array can each be defined with a graph file element, for example. Graph file elements from the array can be saved to an output file by the graph converter 530, for example.

The example subgraph extractor 540 extracts one or more subgraphs of the big data graph 310 that satisfy one or more given conditions (e.g., based on the query graph 320, other specified constraints, preferences, etc.). In certain examples, subgraph(s) are extracted based on the subgraph isomorphism Algorithm 1 to process the output file of the graph converter 530 to identify vertices in the big data graph 310 that match vertices in the query graph 520 and associated edges.

In the example of FIG. 5, the subgraph matcher 550 scores each subgraph extracted by the subgraph extractor 540 and, based on the scores, finds the best match for the query graph 320 (e.g., using a shortest distance algorithm and a shortest path algorithm, etc.). The shortest distance of finds a shortest distance of the nodes of a graph from a given landmark vertex, for example. The shortest path finds a shortest path between any two vertices of a graph, for example.

The example subgraph matcher 550 works with a path analyzer 560 and a distance analyzer 570 to determine a path having shortest path and a shortest distance, respectively, associated with a particular subgraph. The example path analyzer 560 evaluates the subgraph input from the subgraph matcher 550 to determine a shortest path between vertices of the graph. A shortest path is a sequence of vertices that describe a path between vertices u and v, for example, that is shortest among possible paths or routes connecting the vertices u and v. In certain examples, multiple shortest paths can exist between two vertices, and the path analyzer 560 stores the combination of vertices (and, in some examples, edges) each shortest path. The example distance analyzer 570 computes a numeric length of a shortest path (e.g., based on number of vertices and/or edges, based on a weighted number of vertices and/or edges, etc.). In certain examples, even when multiple shortest paths are identified by the path analyzer 560, the distance analyzer 570 computes and stores a single shortest distance value. In other examples, the path analyzer 560 identifies one shortest path, and the distance analyzer 570 stores a distance for analyzed nodes of the main graph 310 from a target vertex being examined.

The subgraph matcher 550 uses shortest path information from the path analyzer 560 and shortest distance from the distance analyzer 570 to score each identified subgraph and find a best matching subgraph 330 from the big data graph 310 with respect to the query graph 320. The subgraph matcher 550 evaluates each matching triplet from the subgraph extractor 540 in conjunction with shortest path and shortest distance to identify a best matching subgraph 330 to the query graph 320 from the one or more identified subgraphs extracted from the main big data graph 310.

The RE 510 receives the best matching subgraph 330 and can extrapolate additional information (e.g., recommendation(s), etc.) for a user associated with the query graph 320 based on the best matching subgraph 330. For example, the subgraph 330 can include and/or be used to retrieve additional nodes beyond the user query graph 320 which represent recommendation(s) based on the content and/or pattern of the query graph 320. The output 406 can include additional nodes forming a recommendation beyond the identified subgraph 330.

For example, the big data graph 310 may include information regarding activities done by millions of users on a network, and the query graph represents activities done by a single user for a fixed period of time. The subgraph matcher 550 best matches the graph 320 of user activity to a subgraph 330 of the big data activity graph 310, which can then be used by the RE 510 to provide additional activity recommendations based on additional nodes associated with the subgraph 330 that are not part of the query graph 320. Those additional nodes represent activities undertaken by users and/or systems similar to (and/or in similar situations to) the user and/or system associated with the query graph 320.

Figure 6:
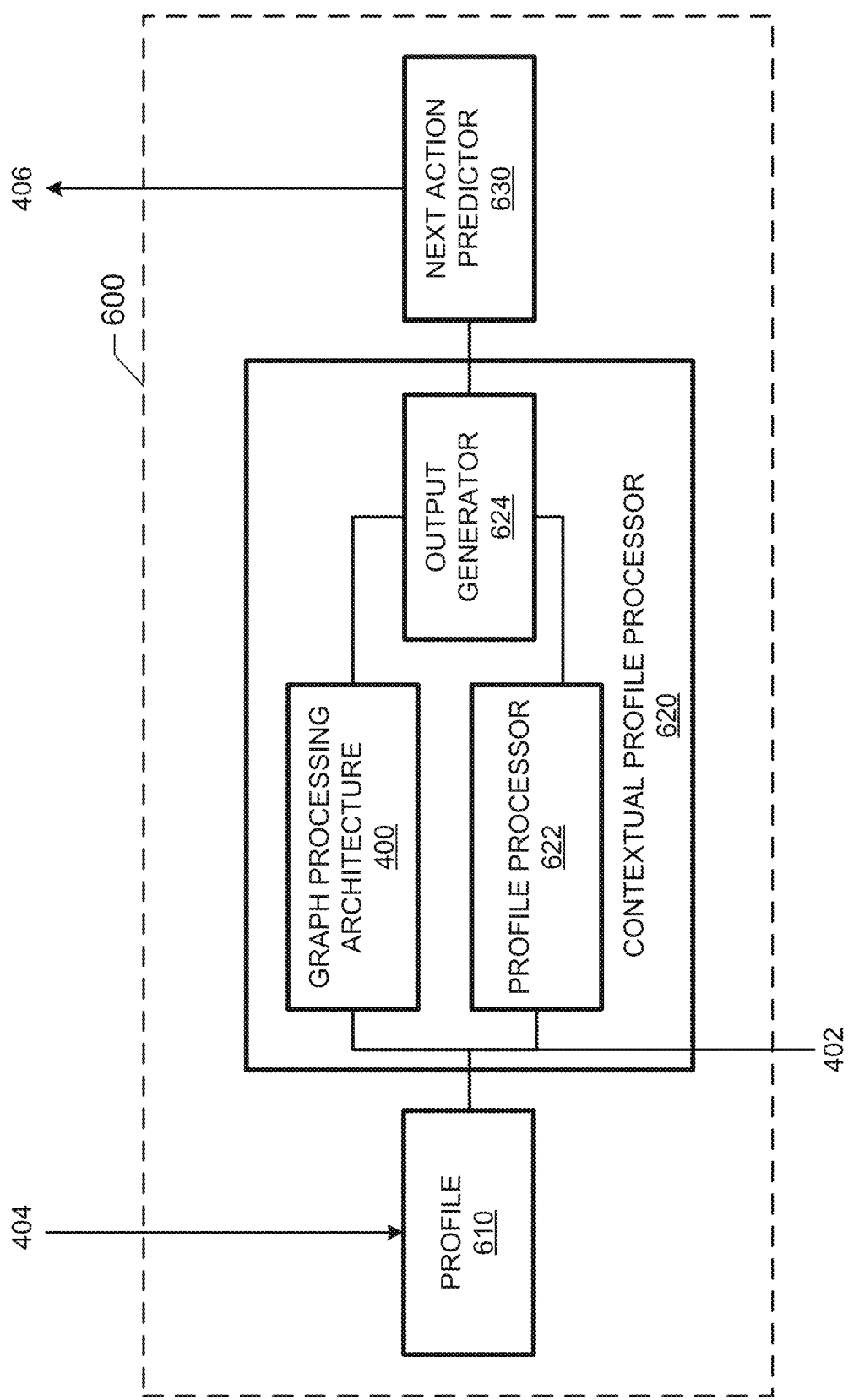
FIG. 6 shows an example recommendation engine implemented using the example graph processing architecture of FIG. 4.

In certain examples, the example graph processing architecture 400 can be used to implement a personal recommendation engine, such as the example personal recommendation engine 600 shown in FIG. 6. The example personal RE 600 includes one or more profiles 610, a contextual profile processor 620, and a next action predictor 630. The example contextual profile processor 620 includes the graph processing architecture 400 to analyze profile 610 input and generate output 406 from the next action predictor 630.

As illustrated in the example of FIG. 6, the input 404 (e.g., including the query graph 320) forms part of the one or more profile(s) 610 describing a querying user. For example, the profile(s) 610 can include information in graph and/or other data form regarding user physical profile, social profile, online interest profile, etc. Physical profile information can include age, lifestyle (e.g., travel, talks, active, etc.), gender, applications installed on a mobile device (e.g., a cellular phone, tablet computer, etc.), location, mobile device data, etc. Social profile information can include online social media account information such as Facebook™, Twitter™, etc. Online interest profile information can include browser history, product research, etc. The profile information can be represented in the user graph 320, for example.

The contextual profile processor 620 receives graph and/or other information from the profile(s) 610 and processes the information to generate a recommendation 406. The output recommendation information 406 can be sent to a requesting external device, such as a mobile device (e.g., cell phone, tablet computer, laptop computer, etc.), for example. In the example of FIG. 6, the contextual profile processor 620 includes the graph processing architecture 400, a profile processor 622, and an output generator 624. The graph processing architecture 400 receives the query graph 320 from the profile 610 information as well as big data graph 310 information via the input 402 and processes the big data graph 310 based on the query graph 320 as described above. The profile processor 622 can process additional information, if present, to be combined with the matching subgraph 330 information by the output generator 624. For example, the profile processor 622 can process default setting(s) and/or other configuration information, personal preference(s), etc., that can be used by the output generator 624 to modify next recommendation(s) provided based on the subgraph 330 output by the graph processor 400.

The example output generator 624 processes the subgraph 330, taken alone or in combination with additional profile output, to generate one or more additional elements. The elements are provided as an output to the next action predictor 630, which generates a recommendation for the user (e.g., via a mobile device associated with the user) based on the matching subgraph 330 (and additional profile information). Thus, the next action predictor 630 can provide one or more personalized recommendations to the user in a privacy friendly manner. For example, an application, such as an Android or iOS application, runs on a user's mobile device and tries to understand the user passively using available mobile data to which the user provides access, such as browsing history, accelerometer data, call log history, etc. The application provides input 404 to the recommendation engine 600, which generates a recommendation after data analysis.

While example implementations of the architecture 100, graph analytics 300, graph processing architecture 400, graph computational processor 410, and recommendation engine 600 are illustrated in FIGS. 1-6, one or more of the elements, processes and/or devices illustrated in FIGS. 1-6 may be combined, divided, re-arranged, omitted, eliminated and/or implemented in any other way. Further, the example graph analyzer 120, the example subgraph matcher 150, the example predictor 170, the example graph computational processor 410, the example data processing engine 420, the example job scheduler(s) 430, the example distributed file system 440, the example recommendation engine 510, the example graph processor 520, the example graph converter 530, the example subgraph extractor 540, the example subgraph matcher 550, the example path analyzer 560, the example distance analyzer 570, the example profile(s) 610, the example contextual profile processor 620, the example profile processor 622, the example output generator 624, the example next action predictor 630, and/or, more generally, the example systems 100, 300, 400, and/or 600 of FIGS. 1-6 may be implemented by hardware, software, firmware and/or any combination of hardware, software and/or firmware. Thus, for example, any of the example graph analyzer 120, the example subgraph matcher 150, the example predictor 170, the example graph computational processor 410, the example data processing engine 420, the example job scheduler(s) 430, the example distributed file system 440, the example recommendation engine 510, the example graph processor 520, the example graph converter 530, the example subgraph extractor 540, the example subgraph matcher 550, the example path analyzer 560, the example distance analyzer 570, the example profile(s) 610, the example contextual profile processor 620, the example profile processor 622, the example output generator 624, the example next action predictor 630, and/or, more generally, the example systems 100, 300, 400, and/or 600 of FIGS. 1-6 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example graph analyzer 120, the example subgraph matcher 150, the example predictor 170, the example graph computational processor 410, the example data processing engine 420, the example job scheduler(s) 430, the example distributed file system 440, the example recommendation engine 510, the example graph processor 520, the example graph converter 530, the example subgraph extractor 540, the example subgraph matcher 550, the example path analyzer 560, the example distance analyzer 570, the example profile(s) 610, the example contextual profile processor 620, the example profile processor 622, the example output generator 624, the example next action predictor 630, and/or, more generally, the example systems 100, 300, 400, and/or 600 of FIGS. 1-6 is/are hereby expressly defined to include a tangible computer readable storage device or storage disk such as a memory (e.g., a read only memory (ROM), hard drive, flash memory, other volatile and/or non-volatile memory, etc.), a digital versatile disk (DVD), a compact disk (CD), a Blu-ray disk, etc. storing the software and/or firmware. Further still, the example systems of FIGS. 1-6 may include one or more elements, processes and/or devices in addition to, or instead of, those illustrated in FIGS. 1-6, and/or may include more than one of any or all of the illustrated elements, processes and devices.

Flowcharts representative of example machine readable instructions for implementing the systems 100, 300, 400, and/or 600 of FIGS. 1-6 are shown in FIGS. 7 and 9-12. In these examples, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a DVD, a Blu-ray disk, or a memory associated with the processor 912, but the entire program and/or parts thereof could alternatively be executed by a device other than the processor 1312 and/or embodied in firmware or dedicated hardware. Further, although the example programs are described with reference to the flowcharts illustrated in FIGS. 7 and 9-12, many other methods of implementing the example systems 100, 300, 400, and/or 600 may alternatively be used. For example, the order of execution of the blocks may be changed, and/or some of the blocks described may be changed, eliminated, or combined.

As mentioned above, the example processes of FIGS. 7 and 9-12 may be implemented using coded instructions (e.g., computer and/or machine readable instructions) stored on a tangible computer readable storage medium such as a hard disk drive, a flash memory, a ROM, a CD, a DVD, a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7 and 9-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 7:
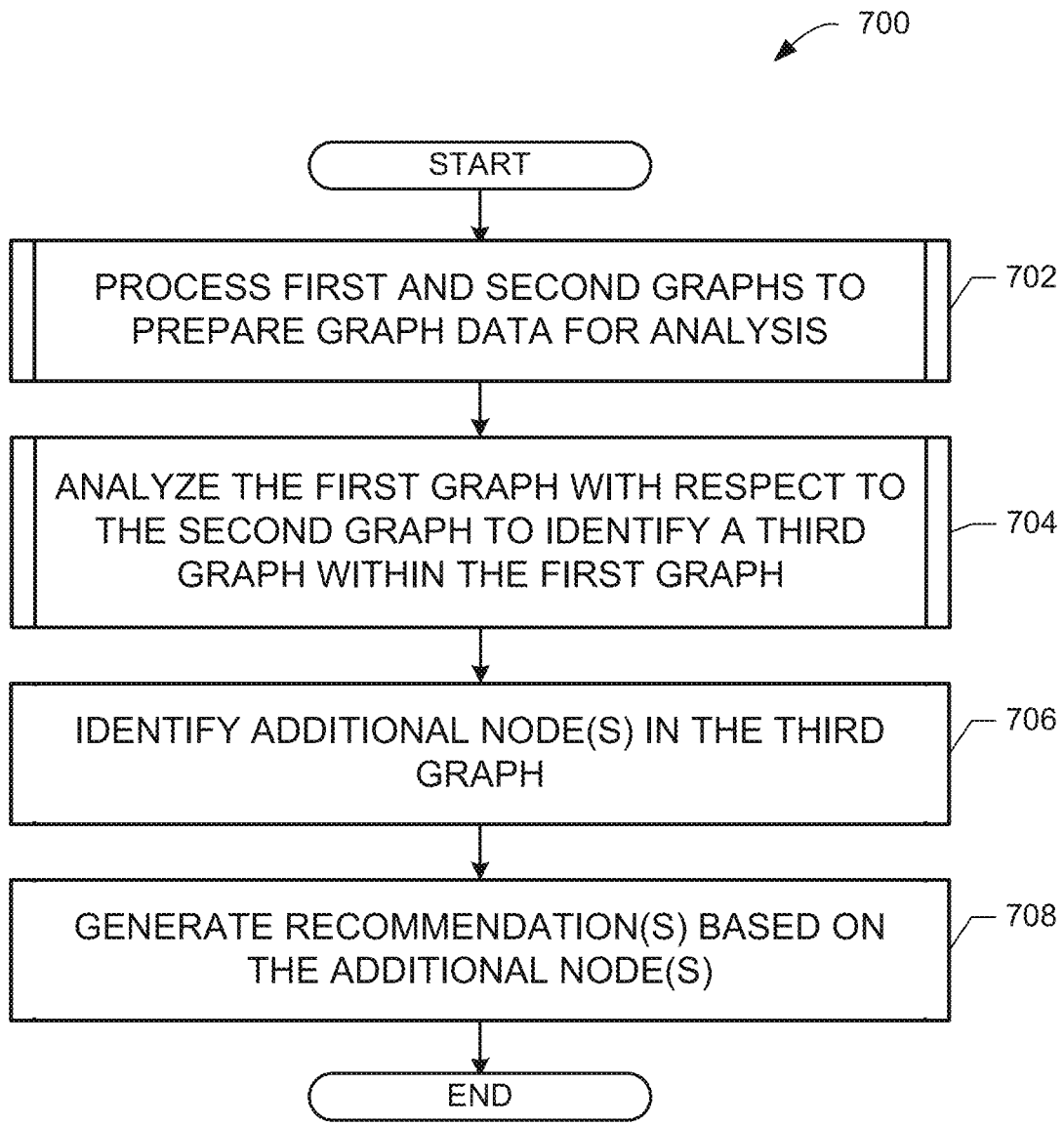
FIG. 7 is a flow chart representative of example machine readable instructions that may be executed to implement the example systems of FIGS. 1-6.

The program 700 of FIG. 7 begins at block 702 at which a first graph (e.g., a main or "big data" graph such as big data graph 310) and a second graph (e.g., a user or query graph 320 smaller than the first graph, etc.) are processed to prepare graph data for analysis. For example, a main "big data" graph 310 is loaded and processed by the example graph processor 520. For example, the graph processor 520 creates a vertex RDD from main graph 310 nodes information and creates an edge RDD from main graph 310 edge information. The representation of the main big data graph 310 (e.g., a big data graph RDD) is formed from the vertex RDD and the edge RDD. Additionally, for example, the graph processor 520 loads and processes an input query graph 320 from an external source, such as a mobile device (e.g., a smart phone, tablet computer, laptop computer, etc.). For example, the graph processor 520 creates a vertex RDD from node information for the query graph 320 and creates an edge RDD from edge information associated with the query graph 320. A representation of the query graph 320 (e.g., a query graph RDD) is formed from the vertex RDD and the edge RDD for the query graph 320.

In certain examples, the representation of the query graph 320 is divided into arrays. For example, rather than processing vertex and edge RDDs within the query graph RDD, the query graph RDD is processed by the example graph converter 532 which converts node, edge, and weight information into one or more arrays. For example, browser history tokens can be extracted from browser history nodes defined in the query graph 320. Additionally, triplets including a source node, a destination node, and a connecting edge can be assigned weights and converted into array(s) for further analysis (e.g., Triplet_0(NYTimes, Twitter, Array(0,1)), etc.). As described above, processing of the main graph 310 can occur in parallel using distributed resources 420, 430, 440.

At block 704, the first graph is analyzed with respect to the second graph to identify a third graph within the first graph. As described above, processing of the first graph with respect to the second graph can occur in parallel using distributed resources 420, 430, 440. For example, triplets from the first graph are compared against triplets from the second graph to identify matching triplets, which are then used to form a third graph, which is a subset or subgraph of the first graph (e.g., a subgraph 330 of the big data graph 310 which matches or is close to matching the query graph 320, etc.). Triplets can be compared for exact matching of nodes and connecting edges, and, in the absence of an exact match, inexact or close matches can be identified. Graph data can be analyzed using software such as the GraphX™ API programmed using Scala, Java, Python, etc.

Figure 8:
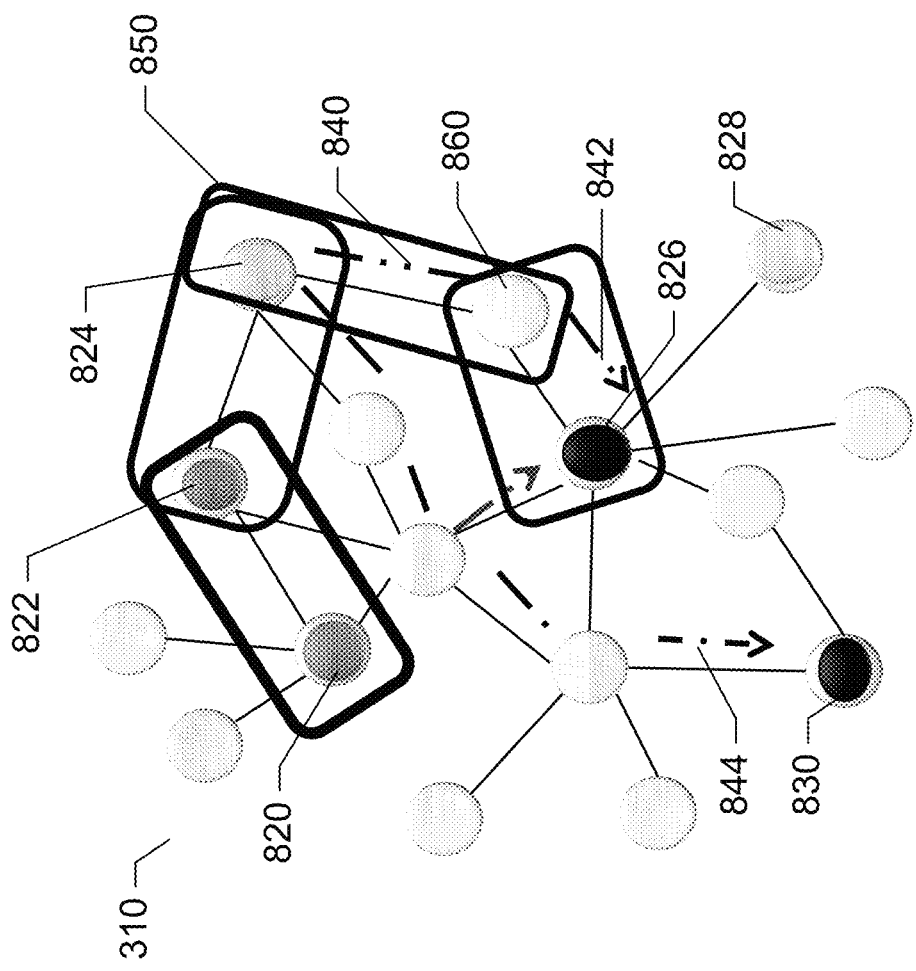
FIG. 8 illustrates an example query graph and main graph being analyzed.
Figure 8:
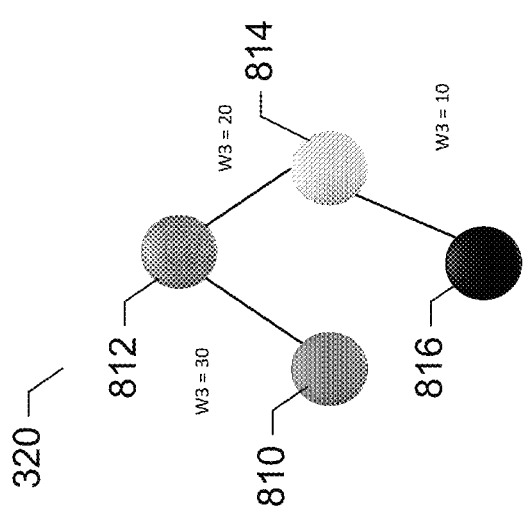

For example, FIG. 8 shows an example query graph 320 including nodes 810, 812, 814, 816. A portion of an example main graph 310 being analyzed includes node 820, which matches node 810, node 822, which matches node 812, node 824, which matches node 814, and node 826, which matches node 816. However, the example portion of the main graph 310 also includes node 828, which matches node 814, and node 830, which matches node 816. A non-matching node 832 sitting between matching nodes 824 and 826. The graph processing architecture 400 analyzes a plurality of possible connecting paths 840, 842, 844 between matching nodes before selecting a best matching path 840 and associated set 850 of nodes 820, 822, 824, 860, 826. The best matching set 850, however, includes an intermediate node 860, which is not found in the query graph 320, but the set 850 includes other matching nodes and represents a shortest path (and fewest number of non-matching nodes) from node 820 to node 826. The best matching set 850 forms the matching subgraph 330.

At block 706, additional node(s) associated with the third graph are identified. For example, one or more nodes connected by edge(s) to the matching subgraph 330 are identified based on their connection to the subgraph 330. Alternatively or in addition, intermediate nodes, such as non-matching node 860 in the example of FIG. 8, can be identified as an additional node. For example, while a user associated with the query graph 320 may not have done action 860 at the point in time of the graph 320, an action associated with the node 860 may be recommended to the user.

At block 708, recommendation(s) are generated based on the identified additional node(s). For example, node 860 and/or other nodes outside but connected to the identified subgraph 330 can represent additional activities, products, keywords, etc., associated with users who match the behavior of the subgraph 330 and, by extension, the user query graph 320. Information associated with those node(s) can be sent as recommendation(s) to a device, such as a mobile device (e.g., smartphone, tablet computer, laptop computer, etc.) associated with the query graph 320 and/or a user associated with the query graph 320, for example. Thus, next actions, products, searches, applications, etc., can be suggested based on user activity from the query graph 320. Also, for example, while a user associated with the query graph 320 may not have done action 860 at the point in time of the graph 320, an action associated with the node 860 may be recommended to the user.

Figure 9:
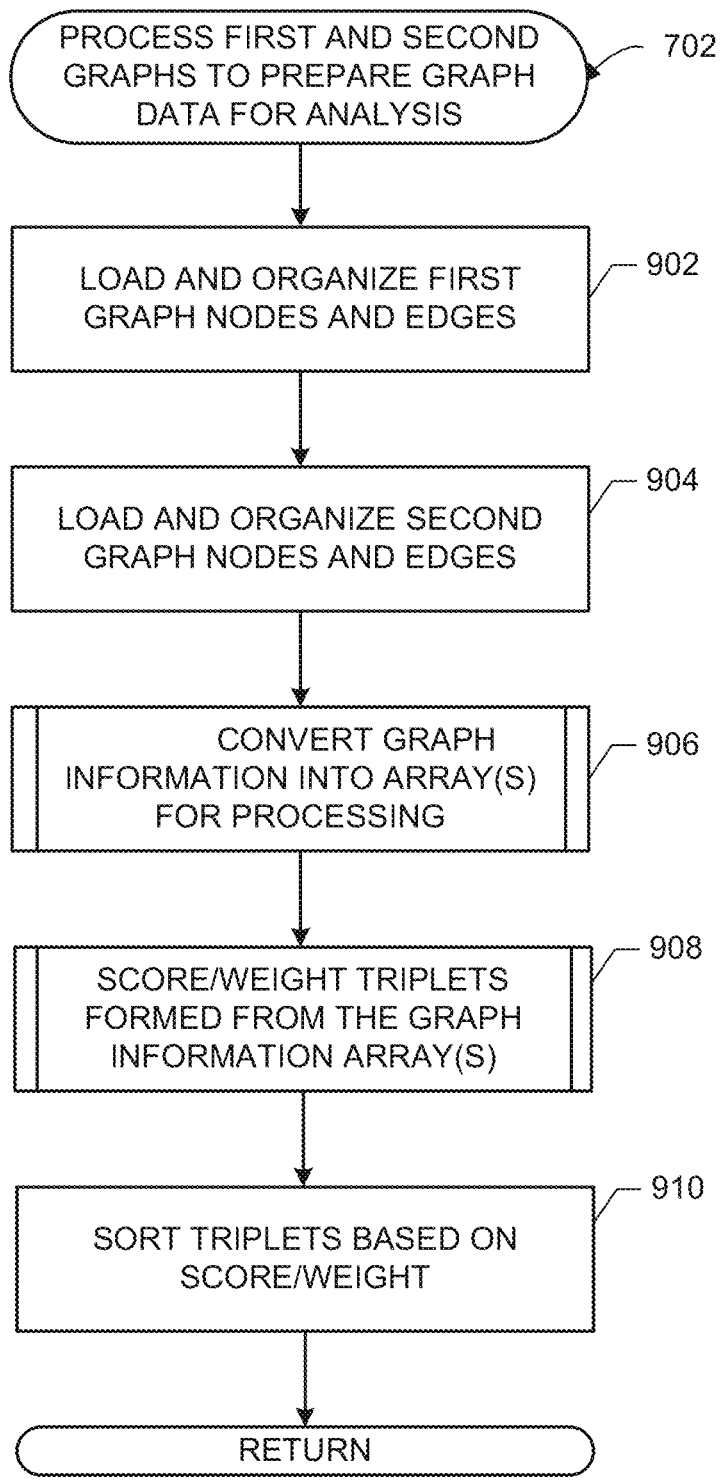
FIGS. 9-12B are flowcharts representative of example machine readable instructions that may be executed to implement the example systems of FIGS. 1-6.

Additional detail associated with processing the first and second graphs to prepare graph data for analysis (block 702) is shown in FIG. 9. At block 902 in the illustrated example of FIG. 9, first graph nodes and edges are loaded and organized, such as according to a first graph vertex RRD and a first graph edge RDD formed from first graph information. For example, the graph processor 520 creates a vertex RDD from main graph 310 nodes information and creates an edge RDD from main graph 310 edge information. The representation of the main big data graph 310 (e.g., a big data graph RDD) is formed from the vertex RDD and the edge RDD.

At block 904, second graph nodes and edges are loaded and organized, such as according to a second graph vertex RRD and a second graph edge RDD formed from query graph 320 information. For example, the graph processor 520 loads and processes an input query graph 320 from an external source, such as a mobile device (e.g., a smart phone, tablet computer, laptop computer, etc.). For example, the graph processor 520 creates a vertex RDD from node information for the query graph 320 and creates an edge RDD from edge information associated with the query graph 320. A representation of the query graph 320 (e.g., a query graph RDD) is formed from the vertex RDD and the edge RDD for the query graph 320.

At block 906, graph information organized at blocks 902 and/or 904 is converted into array(s) for processing. For example, the representation of the query graph 320 is divided into arrays. For example, rather than processing vertex and edge RDDs within the query graph RDD, the query graph RDD is processed by the example graph converter 532 converts node, edge, and weight information into one or more arrays. For example, browser history tokens can be extracted from browser history nodes defined in the query graph 320 and converted into an array. Other information can be extracted from the graph 320 and formed into a triplet (e.g., node 1, node 2, and edge connecting node 1 and node 2, etc.) for storage in an array to be used for further graph analysis.

At block 908, triplets formed from the graph information or scored or weighted. For example, nodes and/or edges in each triplet can be evaluated to assign a weight and/or score based on one or more factors, such as duration, user, history, keyword, product, etc.

At block 910, triplets are sorted based on their score and/or weight. For example, a highest weighted and/or scored triplet is ordered first in an array or set of triplets to be processed (e.g., compared). The triplets are sorted so that the highest rated triplet is evaluated first followed by other triplets in order of weight/score, for example.

Control then returns to block 704 of the example of FIG. 7 for analysis of the graph information. In certain examples, the processing of block 702 can occur in parallel across a plurality of distributed processing resources (e.g., resources from the data processing engine 420 assigned by job schedulers 430 to graph information stored across the distributed file system 440).

Figure 10:
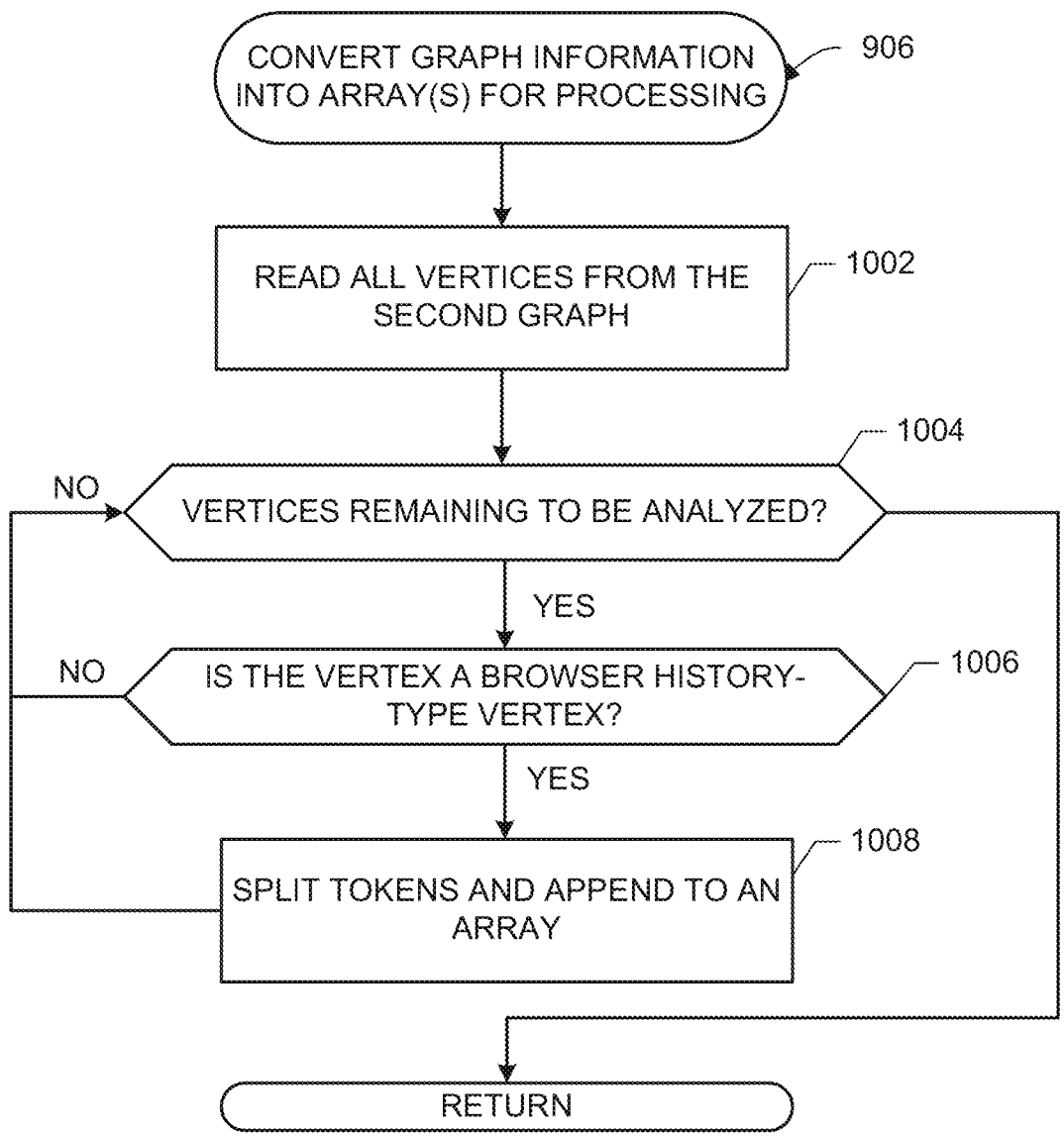

Additional detail associated with converting graph information into array(s) for processing (block 906) is shown in FIG. 10. At block 1002 in the illustrated example of FIG. 10, vertices from the second graph are read (e.g., by the graph converter 532) from the graph information. At block 1004, a value and/or other characteristic (e.g., type, etc.) associated with each vertex is analyzed. For example, at block 1006, each vertex in the second graph is evaluated to determine if it is a browser history vertex (e.g., its type is a browser history node, etc.). If the vertex being evaluated is not a browser history-type vertex, then, at block 1004, a next vertex in the second graph is analyzed. However, if the vertex being evaluated is of browser history-type, then, at block 1008, token(s) in the vertex are split (e.g., by a slash or 'V' or other separating symbol) and appended to an array. The process then advances to the block 1004 to analyze the next vertex in the second graph until no more vertices remain.

Figure 11:
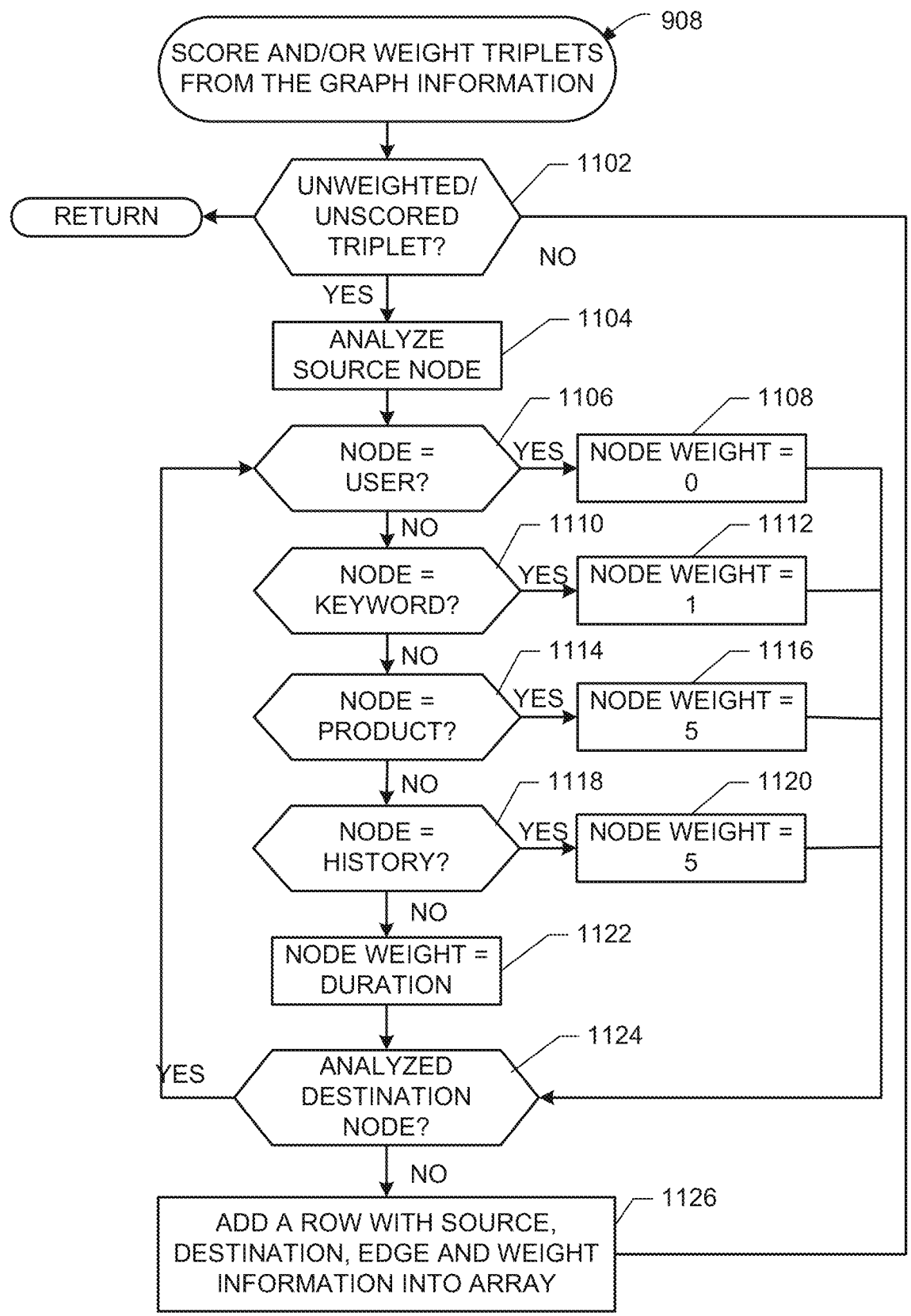

Additional detail associated with scoring and/or weighting triplets from the graph information (block 908) is shown in FIG. 11. At block 1102 in the illustrated example of FIG. 11, a triplet that has not yet been weighted and/or scored is identified. At block 1104, a source node in the triplet is analyzed. For example, a type, content, etc., of the source node is analyzed. Then, at blocks 1106-1122, the source node analysis is evaluated to assign a node weight.

At block 1106, the node is evaluated to determine whether the node is of a user type. If the node is a user node, then, at block 1108, a weight of 0 is assigned to the node.

At block 1110, the node is evaluated to determine whether the node is of a keyword type. If the node is a keyword node, then, at block 1112, a weight of 1 is assigned to the node.

At block 1114, the node is evaluated to determine whether the node is of a product type. If the node is a product node, then, at block 1116, a weight of 5 is assigned to the node.

At block 1118, the node is evaluated to determine whether the node is of a history type. If the node is a history node, then, at block 1120, a weight of 5 is assigned to the node.

At block 1122, if the node has not be identified as user, keyword, product, or history type, then a weight associated with the node is equal to a duration associated with the node.

At block 1124, after the source node has been weighted, the destination node of the selected triplet is evaluated. If the destination node has not yet been weighted, then, control shifts to block 1106 to evaluate a type and assign a weight to the destination node.

If the destination node has been weighted, then, at block 1126, a row including the triplet of source, destination, edge, and associated weight information is added to the array. Control then shifts to block 1102 to determine whether unweighted triplet(s) remain to be processed. Once available query graph triplets have been weighted, control returns to the example process 900.

Figure 12A:
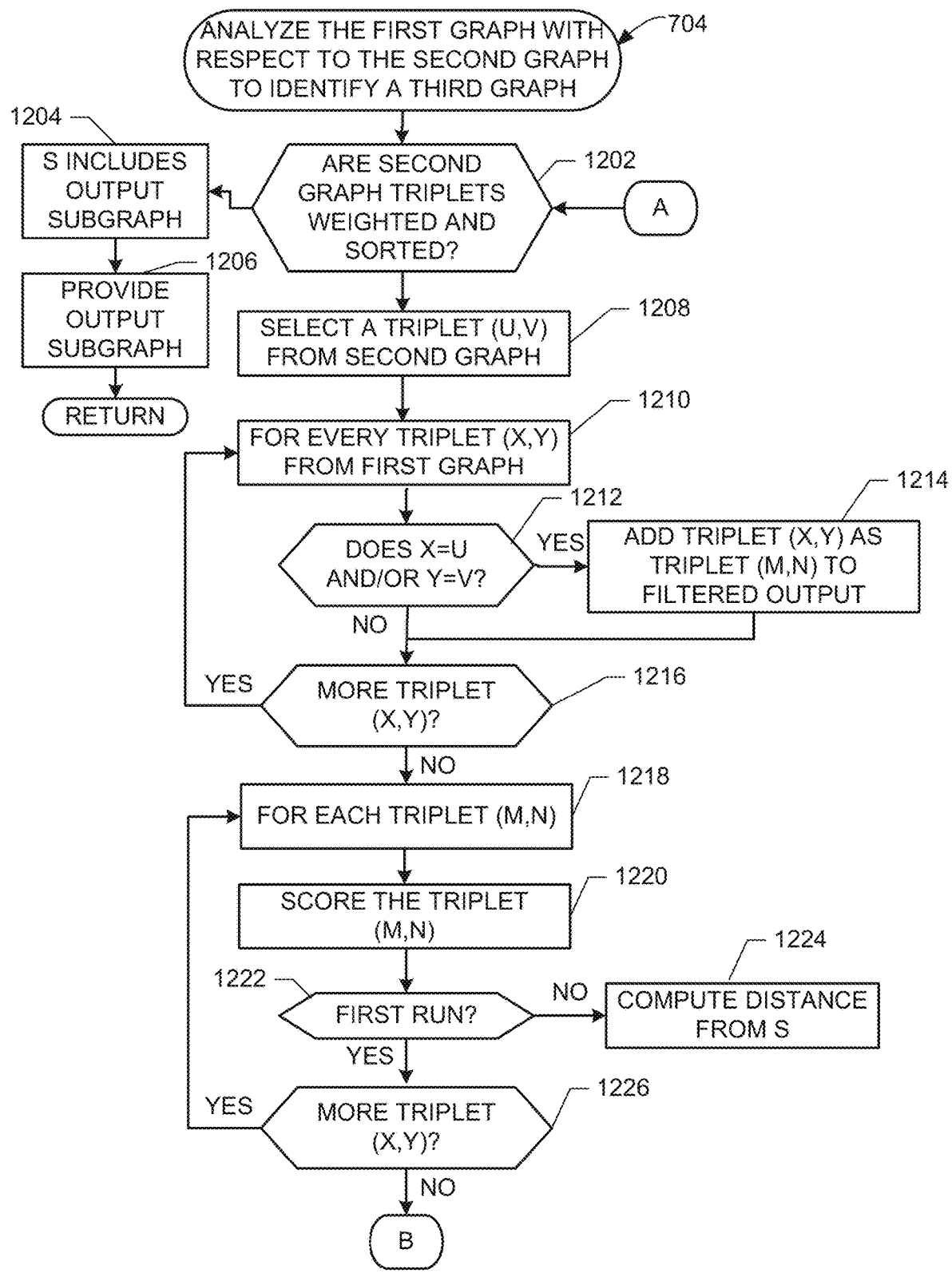
Figure 12B:
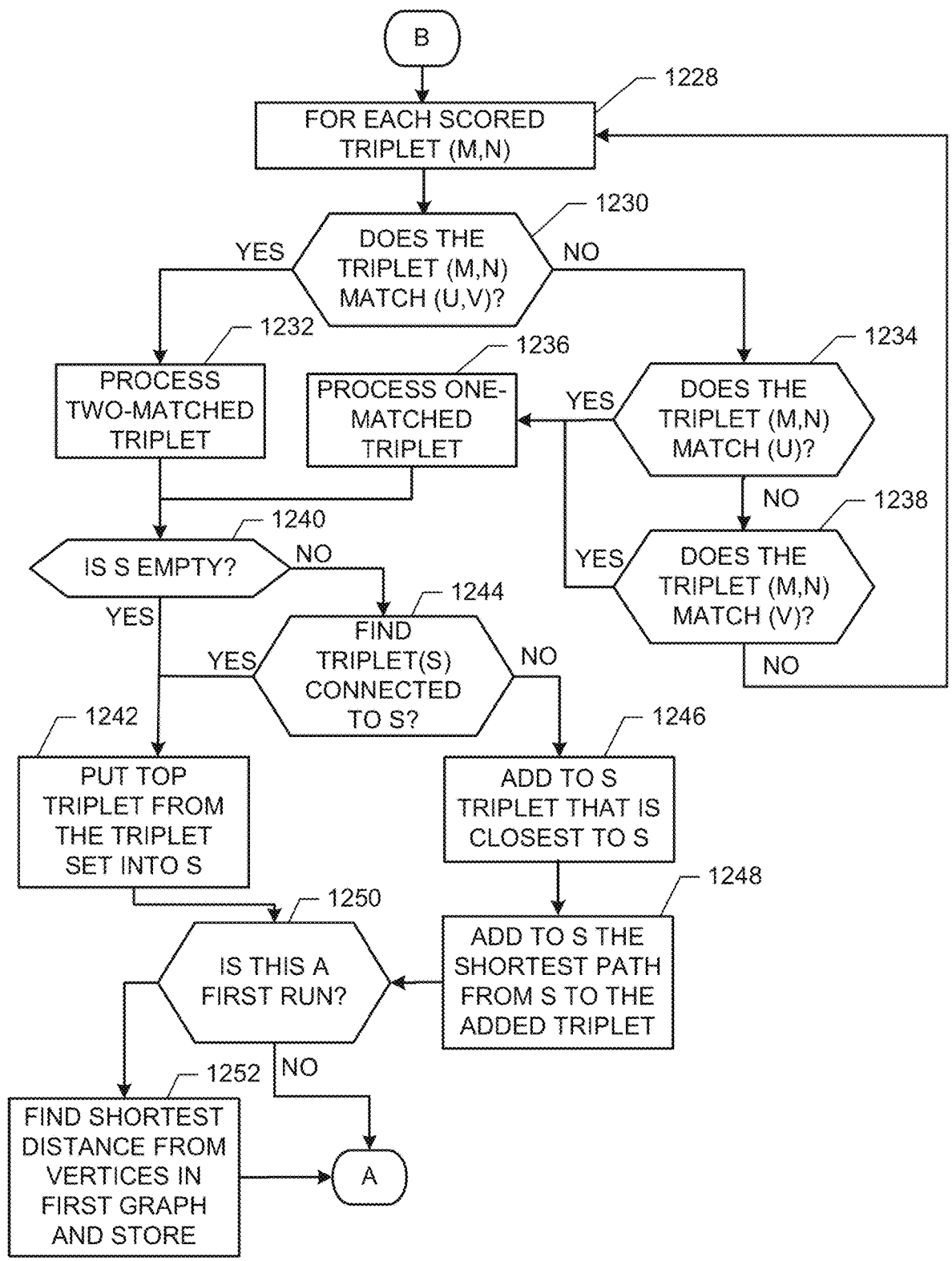

Additional detail associated with analyzing the first graph with respect to the second graph to identify a third graph within the first graph (block 704) is shown in FIGS. 12A-12B. At block 1202 in the illustrated example of FIG. 12A, a set of mobile triplets are reviewed to determine whether the mobile triplets are weighted and sorted. Each triplet can be represented by its pair of nodes (e.g., Triplet_1(book_1, email_2), etc.) and/or can be represented using a notation corresponding to each vertex in the triplet (e.g., Triplet 2(0, 1) wherein node 0=(user_1, user, array(0,0)) and node 1=(Gmail, automated user, array (1,0)), etc.). If the mobile triplets are weighted and sorted, then, at block 1204, the subgraph S includes an output subgraph of triplets (e.g., the subgraph 330). At block 1206, the output subgraph is provided.

If the triplet set from the second graph (e.g., query graph 320 triplets) is not weighted and sorted, then, At block 1208, a first triplet (u,v) is selected) from the second graph (e.g., the user query graph 320).

At block 1210, each triplet (x,y) from the first graph is compared to the selected triplet (u,v) from the second graph. At block 1212, x and y from the first graph triplet are compared to u and v from the second graph triplet to evaluate whether x=u and y=v. If so, then, at block 1214, the triplet (x,y) is added as a triplet (m,n) to a filtered output set.

If (x,y) does not match to (u,v), then, at block 1216, the first graph is evaluated for additional triplets (x,y). If an additional triplet (x,y) is found from the first graph, then control reverts to block 1210. If no additional triplet (x,y) is found (e.g., most or all triplets have been analyzed), then, at block 1218, each triplet (m,n) in the filtered output set is processed.

At block 1220, the triplet (m,n) is scored. For example, the triplet (m,n) can be scored according to one or more threshold and/or criterion. A score (e.g., f(m)) can be associated with a source node of the triplet (m,n), and a score (e.g., f(n)) can be associated with a destination node of the triplet (m,n), for example. A score (e.g., f(m,n)) can be associated with an edge of the triplet (m,n), for example. Example rules for scoring/weighting can include if a node and/or edge relates to a user, keyword, and/or product (e.g., is of a user-type, keyword-type, and/or product-type, etc.), then a score associated with the node and/or edge is increased by an increment (e.g., +1, +2, etc.). If the node and/or edge relates to a browser history, then the score associated with the node and/or edge is increased by a number of tokens matching (e.g., the score is increased by +1, +2, etc., based on the number of tokens matching the selected triplet (x,y) from the second graph), for example. In some examples, a node can be assigned a score based on duration (e.g., 2-Abs(difference between duration of (m,n) and duration of (x,y)), etc.). If a triplet (m,n) does not match triplet (x,y), then the triplet can be negatively scored (e.g., −99, −100, etc.), for example.

At block 1222, the triplet analysis is evaluated to determine whether or not the analysis is a first run (e.g., a first execution analyzing the filtered output set of triplets). If the analysis is not a first run, then, at block 1224, a distance of the triplet (m,n) from S is determined. If the analysis is a first run, then, at block 1226, the filtered output set is evaluated to identify a remaining triplet (m,n) to be analyzed. If another triplet (m,n) exists, then control reverts to block 1218 for processing of the next triplet (m,n). If no more triplets (m,n) remain to be analyzed in the filtered output set, then, at block 1228, the scored triplets (m,n) are analyzed.

At block 1230, the scored triplets (m,n) are evaluated to determine whether (m,n) matches (u,v) from selected triplet (u,v) of the second graph. If (m,n) matches both (u,v) (e.g., m=u and n=v), then, at block 1232, the scored triplets (m,n) are processed as a two-matched triplet set. However, if triplet (m,n) does not match both u and v, then, at block 1234, the triplet (m,n) is evaluated to determine whether m or n matches u. If either m or n matches u, then, at block 1236, the scored triplets (m,n) are processed as a one-matched triplet set. However, if neither m nor n matches u, then, at block 1238, the triplet (m,n) is evaluated to determine m or n matches v. If either m or n matches v, then, at block 1236, the scored triplets (m,n) are processed as a one-matched triplet set. Otherwise, a next scored triplet (m,n) is analyzed at block 1230.

At block 1240, for the two-matched triplet set (block 1232) or one-matched triplet set (block 1236), the output subgraph S is evaluated to determine whether the set S is empty. If the set S is empty, then, at block 1242, a top-scored triplet from the set (e.g., the two-matched triplet set from block 1232 or the one-matched triplet set from block 1236) is placed into subgraph S (e.g., subgraph 330). If the set S is not empty, then, at block 1244, the set (e.g., the two-matched triplet set from block 1232 or the one-matched triplet set from block 1236) is analyzed to find a triplet that is connected to the subgraph S (e.g., includes a node or edge connected to a node or edge in the subgraph S, etc.). If a connected triplet is found, then, at block 1242, a top-scored triplet from the set (e.g., the two-matched triplet set from block 1232 or the one-matched triplet set from block 1236) is placed into subgraph S. If a connected triplet is not found, then, at block 1246, a triplet that is closest (e.g., closest distance such as evidenced by fewest intermediate nodes between a node of the triplet and a node of S, etc.) is added to the subgraph S. Additionally, at block 1248, a shortest path from S to the added triplet is added to the subgraph S (e.g., the added closest triplet and its shortest path to S are added to the subgraph S).

At block 1250, the processing is reviewed to determine whether it is a first run analysis of the scored triplets (m,n). If it is a first run, then, at block 1252, a shortest distance from vertices in the first graph to the added triplet is determined and stored in a distance array. Control reverts to block 1202.

Thus, graph analytics can identify a usage pattern, such as website browser history, call log, application execution history, keyword search, etc., and match that pattern node-by-node (exactly or inexactly with a partial match, etc.) and then extrapolate between the search pattern to leverage the big data graph for recommendations of additional activities, webpages, applications, searches, etc., that may be useful based on the usage pattern. As another example, a pattern of nodes representing program execution can be identified and additional program execution elements, patterns, etc., can be identified from the broader collection of data.

Figure 13:
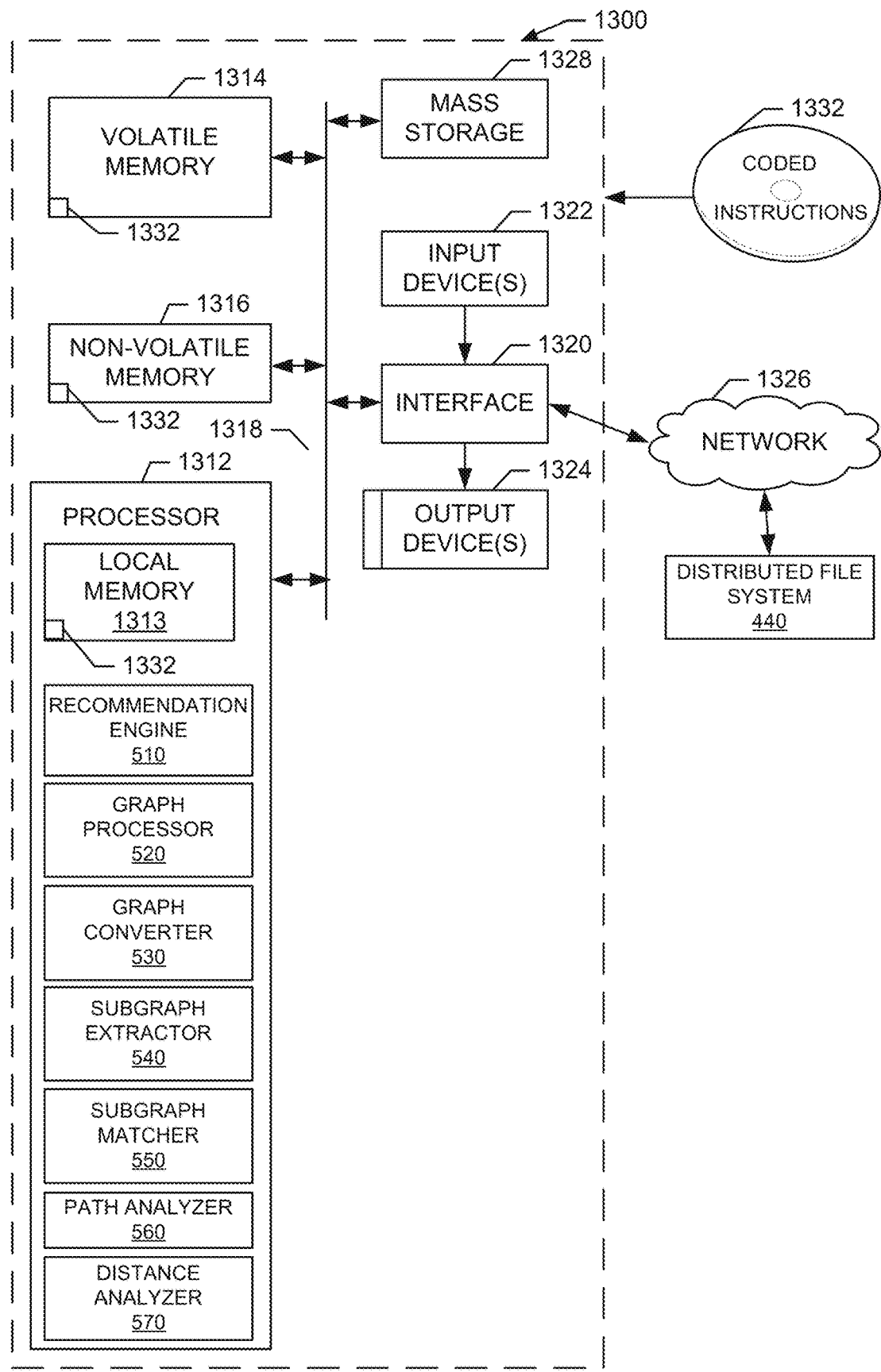
FIG. 13 is a schematic illustration of an example processor platform that may execute the instructions of FIGS. 7 and 9-12B to implement the example systems of FIGS. 1-6 and 8.

FIG. 13 is a block diagram of an example processor platform 1300 capable of executing the instructions of FIGS. 7 and 9-12 to implement the systems of FIGS. 1-6. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In the illustrated example, the processor 1312 is structured to include the example recommendation engine 510, the example graph processor 520, the example graph converter 530, the example subgraph extractor 540, the example subgraph matcher 550, the example path analyzer 560, and/or the example distance analyzer 570 of the example graph computational processor 410.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a peripheral component interconnect (PCI) express interface.

In the illustrated example, one or more input devices 1322 are connected to the interface circuit 1320. The input device(s) 1322 permit(s) a user to enter data and commands into the processor 1312. The input device(s) 1322 can be implemented by, for example, an audio sensor, a microphone, a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.). In certain examples, the distributed file system 440 can communicate with the processor platform 1300 via the network 1326.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIGS. 7 and 9-12 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods, apparatus and articles of manufacture facilitate big data graph analysis using a smaller query graph for comparison (e.g., distributed, parallel comparison) with the big data graph to extract a subgraph from the big data graph that is relevant to the query. Nodes in and/or attached to the subgraph can be analyzed to generate recommendation(s) in response to the query. Certain examples provide a scale-out technology foundation using a distributed computing environment to process portions of the big data graph in parallel using the same query graph.

A scale-out approach handles system bottlenecks by leveraging scalable graph-based technologies (e.g., scalable to billions of nodes, etc.). For example, in one implementation using a scale-out approach and monitoring a group of 25 users over a period of 6 months, rather than a scale-up approach, can increase efficiency in terms of returning relevant nodes by around 37% (e.g., from 33% to 70%). The example scale-out approach also reduces a number of irrelevant nodes in returned subgraph from 99% (e.g., in a scale-up approach) to 33%. The scale-out, subgraph matching approach provides greater flexibility and scalability compared to a traditional scale-up graph cutting approach.

Certain examples facilitate usage pattern processing to generate a recommendation based on past and anticipated future behavior. Certain examples provide a pull-based, rather than push-based, graph-based recommendation engine. Recommendations are generated based on user actions (e.g., via a mobile device) rather than pushing non-customized recommendations. Thus, for example, by matching a first location, a keyword search, a change to a second location, and an activity of a first user, for example, as represented by graph nodes and connecting edges, to the same or similar pattern of activity in a larger population of users (e.g., "big data"), graph analytics can identify additional node(s) and/or connecting edge(s) representing additional activity, path, item, action, etc., that can be recommended to the first user. Similarly, a first monitored series of actions undertaken by a mobile device, which are used to query a larger big data graph, can be used to find a matching (e.g., exactly matching, closely matching, etc.) set of device actions in the big data graph and thereby also identify additional actions which may be appropriate for the mobile device to execute next. Thus, these and other applications can be facilitated using graph analysis systems and methods described and disclosed herein.

Example 1 is an apparatus for graph analysis. The apparatus of example 1 includes a graph computational processor. The graph computational processor of example 1 is configured to analyze a first graph with respect to a second graph to identify a third graph within the first graph by: matching a first triplet from the first graph to a second triplet from the second graph by comparing each node and connecting edge included in each triplet; and generating the third graph by adding, when the first triplet matches the second triplet, the first triplet to a subgraph output set forming the third graph. The graph computational processor of example 1 is configured to identify an additional node in the first graph based on the third graph and generate an output based on the additional node.

Example 2 includes the subject matter of example 1, wherein analyzing the first graph with respect to the second graph to identify the third graph further includes scoring the first triplet in the first graph.

Example 3 includes the subject matter of example 2, wherein matching the first triplet from the first graph to the second triplet from the second graph further includes selecting the first triplet instead of a third triplet because the first triplet has a higher score than the third triplet.

Example 4 includes the subject matter of example 1, wherein matching the first triplet from the first graph to the second triplet from the second graph includes comparing each node and connecting edge included in each triplet to match at least one node from the first triplet to at least one node from the second triplet.

Example 5 includes the subject matter of example 5, wherein, when only one node in the first triplet matches one node in the second triplet, the first triplet is selected to be added to the subgraph output set based on an analysis of a distance between the subgraph output set and the first triplet.

Example 6 includes the subject matter of example 1, wherein the output includes a recommendation of a next action based on the additional node.

Example 7 includes the subject matter of example 1, wherein the additional node is at least one of: a) included in the third graph but not in the second graph or b) connected to but not included in the third graph.

Example 8 is a method to analyze a graph. The method of example 8 includes analyzing, using a processor, a first graph with respect to a second graph to identify a third graph within the first graph by: matching a first triplet from the first graph to a second triplet from the second graph by comparing each node and connecting edge included in each triplet; and generating the third graph by adding, when the first triplet matches the second triplet, the first triplet to a subgraph output set forming the third graph. Example 8 also includes identifying an additional node in the first graph based on the third graph; and generating an output based on the additional node.

Example 9 includes the subject matter of example 8, wherein analyzing the first graph with respect to the second graph to identify the third graph further includes scoring the first triplet in the first graph.

Example 10 includes the subject matter of example 9, wherein matching the first triplet from the first graph to the second triplet from the second graph further includes selecting the first triplet instead of a third triplet because the first triplet has a higher score than the third triplet.

Example 11 includes the subject matter of example 8, wherein matching the first triplet from the first graph to the second triplet from the second graph includes comparing each node and connecting edge included in each triplet to match at least one node from the first triplet to at least one node from the second triplet.

Example 12 includes the subject matter of example 11, wherein, when only one node in the first triplet matches one node in the second triplet, the first triplet is selected to be added to the subgraph output set based on an analysis of a distance between the subgraph output set and the first triplet.

Example 13 includes the subject matter of example 8, wherein the output includes a recommendation of a next action based on the additional node.

Example 14 includes the subject matter of example 8, wherein the additional node is at least one of: a) included in the third graph but not in the second graph or b) connected to but not included in the third graph.

Example 15 is a tangible computer readable storage medium comprising computer readable instructions which, when executed, cause a processor to at least analyze a first graph with respect to a second graph to identify a third graph within the first graph by: matching a first triplet from the first graph to a second triplet from the second graph by comparing each node and connecting edge included in each triplet; and generating the third graph by adding, when the first triplet matches the second triplet, the first triplet to a subgraph output set forming the third graph. Example 15 also includes identify an additional node in the first graph based on the third graph; and generate an output based on the additional node.

Example 16 includes the subject matter of example 15, wherein analyzing the first graph with respect to the second graph to identify the third graph further includes scoring the first triplet in the first graph.

Example 17 includes the subject matter of example 16, wherein matching the first triplet from the first graph to the second triplet from the second graph further includes selecting the first triplet instead of a third triplet because the first triplet has a higher score than the third triplet.

Example 18 includes the subject matter of example 15, wherein matching the first triplet from the first graph to the second triplet from the second graph includes comparing each node and connecting edge included in each triplet to match at least one node from the first triplet to at least one node from the second triplet.

Example 19 includes the subject matter of example 18, wherein, when only one node in the first triplet matches one node in the second triplet, the first triplet is selected to be added to the subgraph output set based on an analysis of a distance between the subgraph output set and the first triplet.

Example 20 includes the subject matter of example 15, wherein the output includes a recommendation of a next action based on the additional node.

Example 21 includes the subject matter of example 15, wherein the additional node is at least one of: a) included in the third graph but not in the second graph or b) connected to but not included in the third graph.

Example 22 is a system to analyze graph information. Example 22 includes a means for matching a first triplet from the first graph to a second triplet from the second graph by comparing each node and connecting edge included in each triplet. Example 22 includes a means for generating the third graph by adding, when the first triplet matches the second triplet, the first triplet to a subgraph output set forming the third graph. Example 22 includes a means for identifying an additional node in the first graph based on the third graph. Example 22 includes a means for generating an output based on the additional node.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for graph analysis, the apparatus comprising:
    a graph computational processor to:
        analyze a first graph with respect to a second graph to identify a third graph within the first graph by:
            forming i) a first triplet from nodes in the first graph and ii) a second triplet from nodes in the second graph, wherein each of the first triplet and the second triplet is formed by logically joining two nodes and a connecting edge;
            matching the first triplet from the first graph to the second triplet from the second graph by comparing each node and connecting edge included in each triplet; and
            generating the third graph by adding, when the first triplet matches the second triplet, the first triplet to a subgraph output set forming the third graph from at least one of a plurality of subgraphs in the subgraph output set;
        identify an additional node in the first graph based on the third graph, the additional node at least one of connected to or included in the first graph and the third graph, the additional node not connected to or included in the second graph; and
        generate an output based on an analysis of the additional node.

2. An apparatus as defined in claim 1, wherein the graph computation processor is to analyze the first graph with respect to the second graph to identify the third graph by scoring the first triplet in the first graph.

3. An apparatus as defined in claim 2, wherein the graph computation processor is to match the first triplet from the first graph to the second triplet from the second graph by selecting the first triplet instead of a third triplet because the first triplet has a higher score than the third triplet.

4. An apparatus as defined in claim 1, wherein the graph computation processor is to match the first triplet from the first graph to the second triplet from the second graph by comparing each node and connecting edge included in each triplet to match at least one node from the first triplet to at least one node from the second triplet.

5. An apparatus as defined in claim 4, wherein, when only one node in the first triplet matches one node in the second triplet, the graph computation processor is to select the first triplet to be added to the subgraph output set based on an analysis of a distance between the subgraph output set and the first triplet.

6. An apparatus as defined in claim 1, wherein the output includes a recommendation of a next action based on the additional node.

7. An apparatus as defined in claim 1, further including a memory.

8. A method to analyze a graph, the method comprising:
    analyzing, using a processor, a first graph with respect to a second graph to identify a third graph within the first graph by:
        forming i) a first triplet from nodes in the first graph and ii) a second triplet from nodes in the second graph, wherein each of the first triplet and the second triplet is formed by logically joining two nodes and a connecting edge;
        matching the first triplet from the first graph to the second triplet from the second graph by comparing each node and connecting edge included in each triplet; and
        generating the third graph by adding, when the first triplet matches the second triplet, the first triplet to a subgraph output set forming the third graph from at least one of a plurality of subgraphs in the subgraph output set;
    identifying an additional node in the first graph based on the third graph, the additional node at least one of connected to or included in the first graph and the third graph, the additional node not connected to or included in the second graph; and
    generating an output based on an analysis of the additional node.

9. A method as defined in claim 8, wherein analyzing the first graph with respect to the second graph to identify the third graph further includes scoring the first triplet in the first graph.

10. A method as defined in claim 9, wherein matching the first triplet from the first graph to the second triplet from the second graph further includes selecting the first triplet instead of a third triplet because the first triplet has a higher score than the third triplet.

11. A method as defined in claim 8, wherein matching the first triplet from the first graph to the second triplet from the second graph includes comparing each node and connecting edge included in each triplet to match at least one node from the first triplet to at least one node from the second triplet.

12. A method as defined in claim 11, wherein, when only one node in the first triplet matches one node in the second triplet, the first triplet is selected to be added to the subgraph output set based on an analysis of a distance between the subgraph output set and the first triplet.

13. A method as defined in claim 8, wherein the output includes a recommendation of a next action based on the additional node.

14. A tangible computer readable storage medium comprising computer readable instructions which, when executed, cause a processor to at least:
    analyze a first graph with respect to a second graph to identify a third graph within the first graph by:
        forming i) a first triplet from nodes in the first graph and ii) a second triplet from nodes in the second graph, wherein each of the first triplet and the second triplet is formed by logically joining two nodes and a connecting edge;
        matching the first triplet from the first graph to the second triplet from the second graph by comparing each node and connecting edge included in each triplet; and
        generating the third graph by adding, when the first triplet matches the second triplet, the first triplet to a subgraph output set forming the third graph from at least one of a plurality of subgraphs in the subgraph output set;
    identify an additional node in the first graph based on the third graph, the additional node at least one of connected to or included in the first graph and the third graph, the additional node not connected to or included in the second graph; and generate an output based on an analysis of the additional node.

15. A tangible computer readable storage medium as defined in claim 14, wherein analyzing the first graph with respect to the second graph to identify the third graph further includes scoring the first triplet in the first graph.

16. A tangible computer readable storage medium as defined in claim 15, wherein matching the first triplet from the first graph to the second triplet from the second graph further includes selecting the first triplet instead of a third triplet because the first triplet has a higher score than the third triplet.

17. A tangible computer readable storage medium as defined in claim 14, wherein matching the first triplet from the first graph to the second triplet from the second graph includes comparing each node and connecting edge included in each triplet to match at least one node from the first triplet to at least one node from the second triplet.

18. A tangible computer readable storage medium as defined in claim 17, wherein, when only one node in the first triplet matches one node in the second triplet, the first triplet is selected to be added to the subgraph output set based on an analysis of a distance between the subgraph output set and the first triplet.

19. A tangible computer readable storage medium as defined in claim 14, wherein the output includes a recommendation of a next action based on the additional node.

* * * * *